(12) United States Patent
Ewing et al.

(10) Patent No.: US 12,511,507 B2
(45) Date of Patent: Dec. 30, 2025

(54) SUCKER ROD AND TUBULAR IDENTIFICATION AND TRACKING

(71) Applicant: TRC Services, Inc., The Woodlands, TX (US)

(72) Inventors: Stephen Ewing, Midland, TX (US); Michael Eric Johnson, The Woodlands, TX (US); Rodrigo Ariel Ruiz, The Woodlands, TX (US)

(73) Assignee: TRC SERVICES, INC., The Woodlands, TX (US)

( * ) Notice: Subject to any disclaimer, the term of this patent is extended or adjusted under 35 U.S.C. 154(b) by 0 days.

(21) Appl. No.: 18/674,578

(22) Filed: May 24, 2024

(65) Prior Publication Data
US 2024/0412018 A1    Dec. 12, 2024

Related U.S. Application Data

(60) Provisional application No. 63/528,717, filed on Jul. 25, 2023, provisional application No. 63/472,063, filed on Jun. 9, 2023.

(51) Int. Cl.
*G06K 7/14*        (2006.01)
*B23K 26/362*     (2014.01)
*F04B 47/02*      (2006.01)

(52) U.S. Cl.
CPC .......... *G06K 7/1417* (2013.01); *B23K 26/362* (2013.01); *F04B 47/026* (2013.01)

(58) Field of Classification Search
CPC .... G06K 7/1417; B23K 23/362; F04B 47/026
See application file for complete search history.

(56) References Cited

U.S. PATENT DOCUMENTS

| | | | |
|---|---|---|---|
| 7,014,100 B2 | 3/2006 | Zierolf | |
| 7,159,654 B2 | 1/2007 | Ellison et al. | |
| 7,657,468 B1 | 2/2010 | Whiteley et al. | |
| 7,707,076 B1 | 4/2010 | Whiteley et al. | |
| 8,463,664 B2 | 6/2013 | Griggs et al. | |
| 8,947,256 B2 | 2/2015 | Xin et al. | |
| 2004/0078306 A1 | 4/2004 | Whiteley et al. | |
| 2006/0271299 A1* | 11/2006 | Ward | E21B 47/085 702/6 |
| 2012/0075114 A1 | 3/2012 | Xin et al. | |
| 2012/0126008 A1 | 5/2012 | Binmore | |

(Continued)

*Primary Examiner* — Matthew Mikels
(74) *Attorney, Agent, or Firm* — Cabello Hall Zinda, PLLC

(57) ABSTRACT

Identification and tracking of sucker rods, tubulars, and other threaded wellbore components uses a coded indicium or a distinctive marking adjacent threaded areas, such as on the pin ends of the endpieces for the sucker rods or on the counterbore of a tubular coupling. The coded indicium can be applied to a surface of an undercut area located on the pin end between a threaded area and a shoulder of the endpiece. The coded indicium is applied with a non-damaging process, such as laser annealing, laser marking, or another comparable technique. When the endpieces are connected together with a coupling, the coded indicium in the undercut area is covered by the coupling, which threads to the pin ends and engages the shoulder of the endpieces. Secondary tracking can also be achieved using an electronic device, such as an RFID device, disposed on a thread protector for the threaded wellbore component.

33 Claims, 19 Drawing Sheets

(56) References Cited

U.S. PATENT DOCUMENTS

| | | |
|---|---|---|
| 2016/0290127 A1 | 10/2016 | Stephenson et al. |
| 2016/0342916 A1 | 11/2016 | Arceneaux et al. |
| 2017/0044875 A1* | 2/2017 | Hebebrand ............ E21B 19/02 |
| 2017/0246778 A1 | 8/2017 | Trowbridge |
| 2022/0067641 A1 | 3/2022 | Rowe et al. |
| 2023/0077614 A1 | 3/2023 | Tejeda et al. |

* cited by examiner

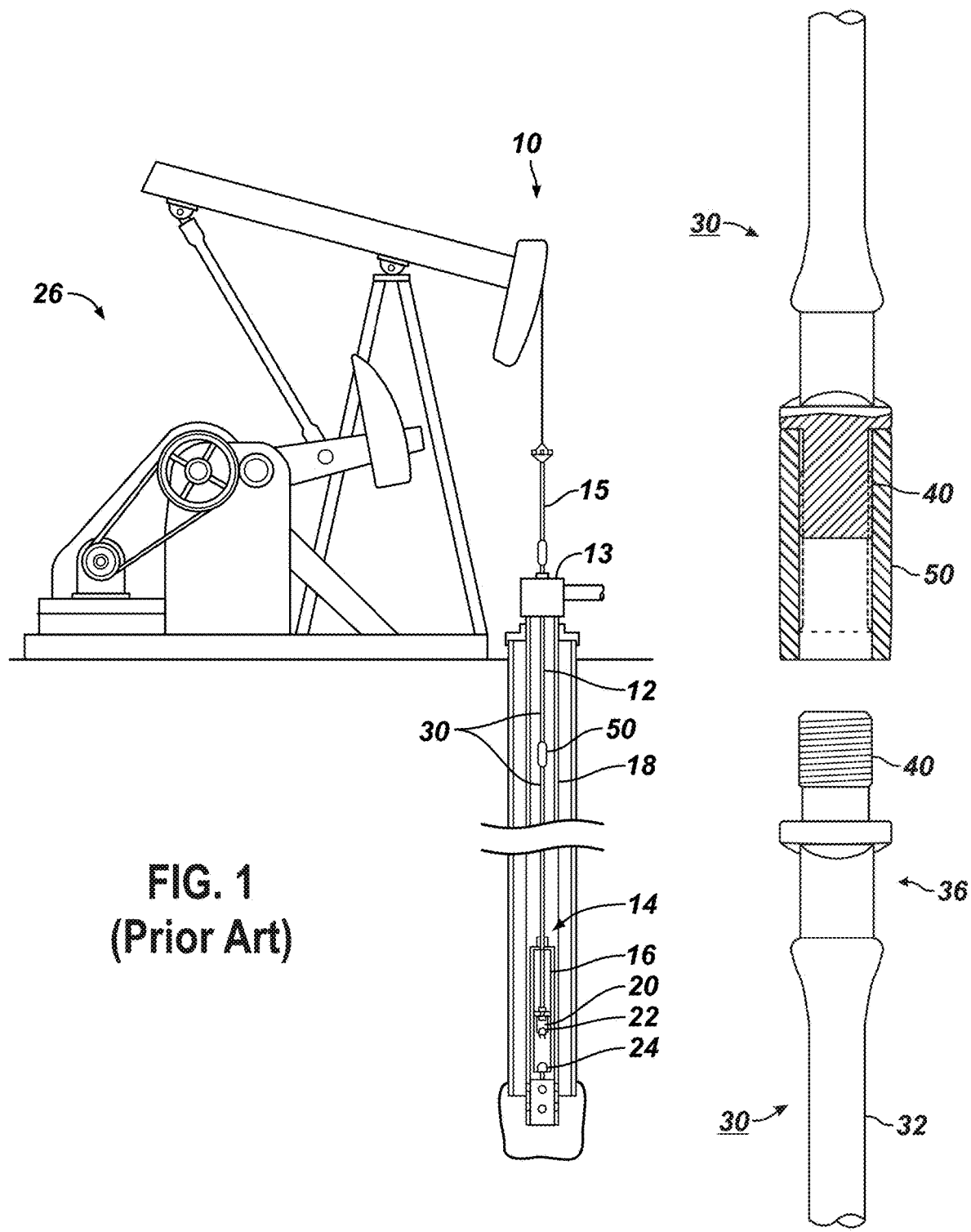

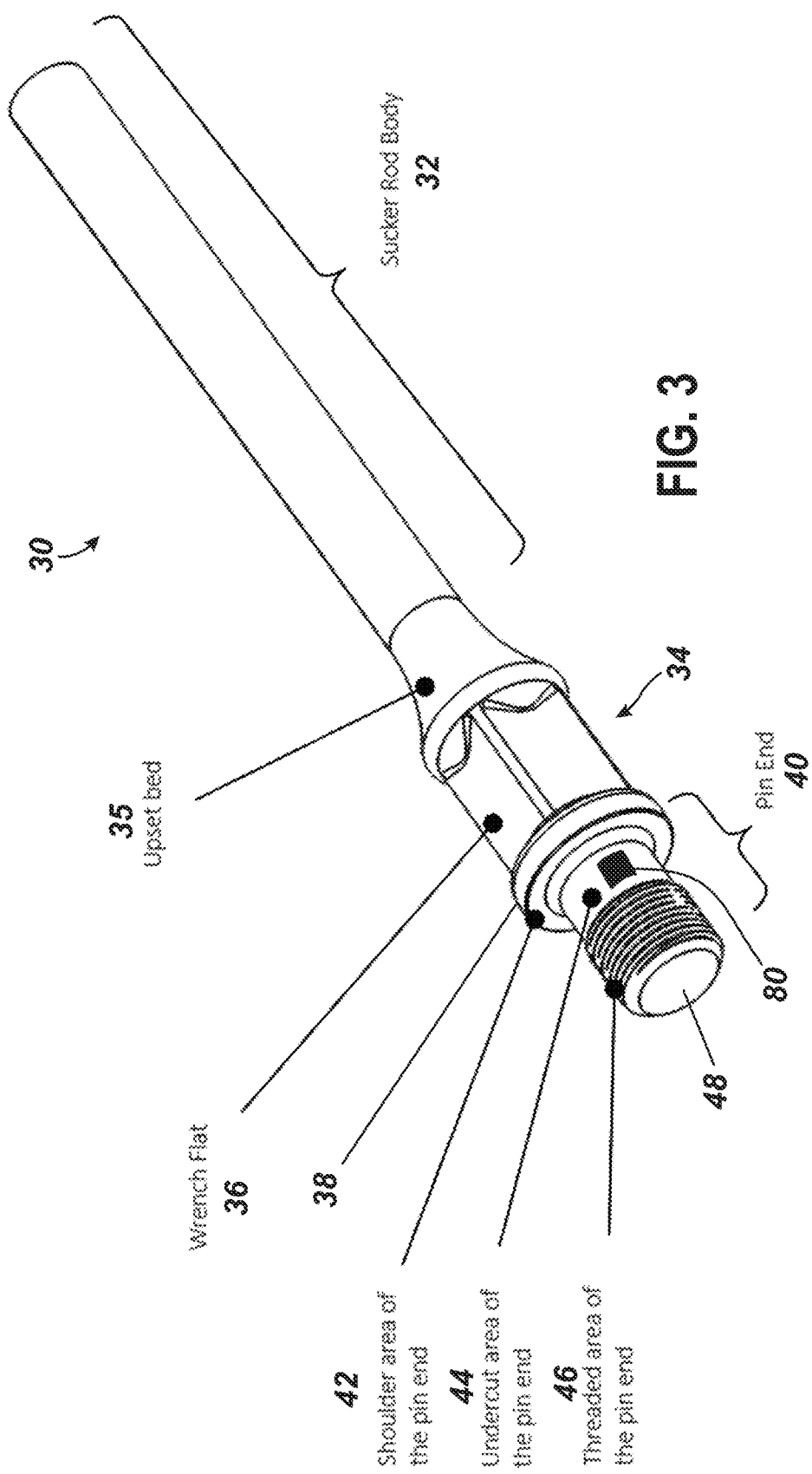

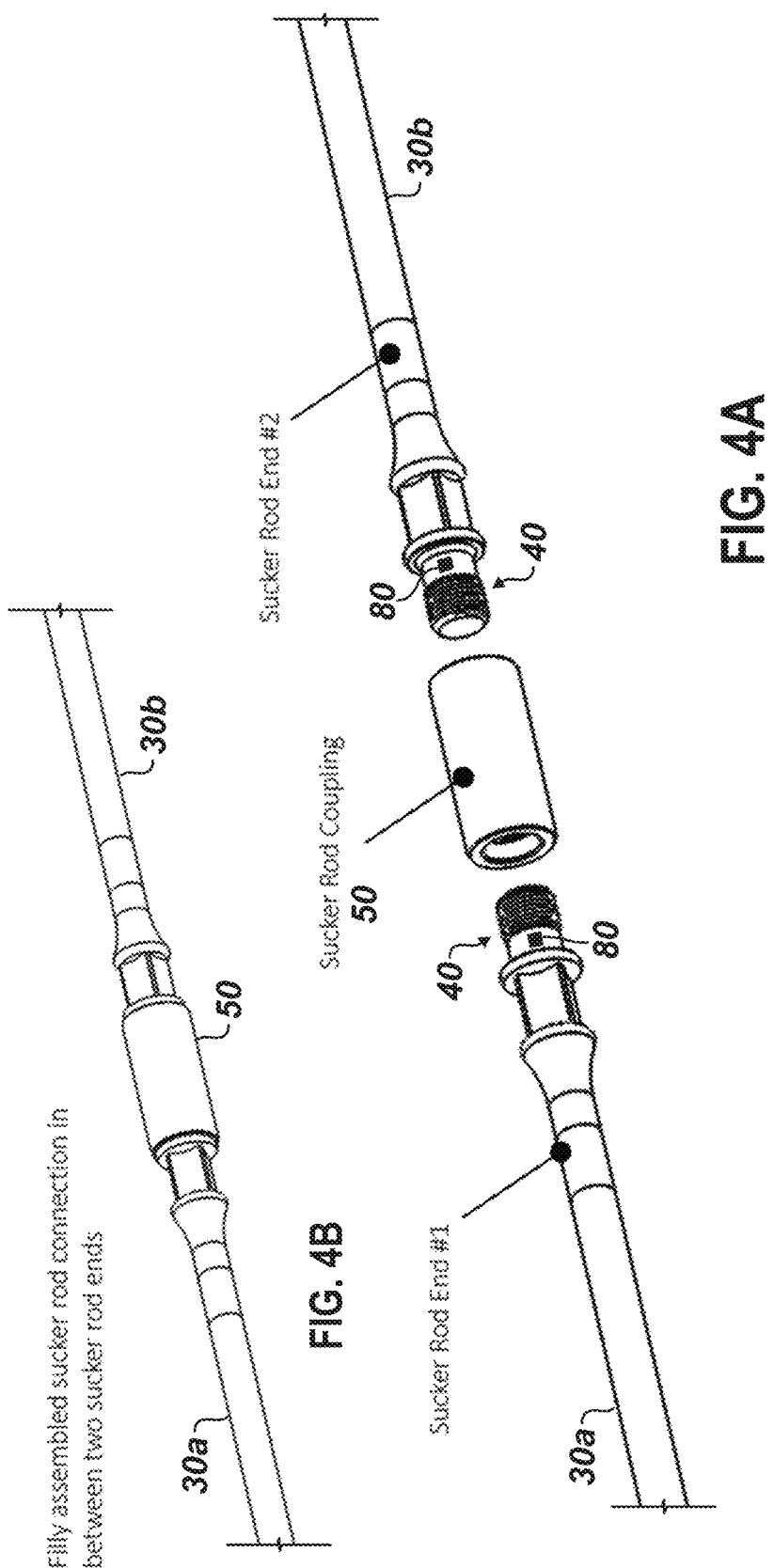

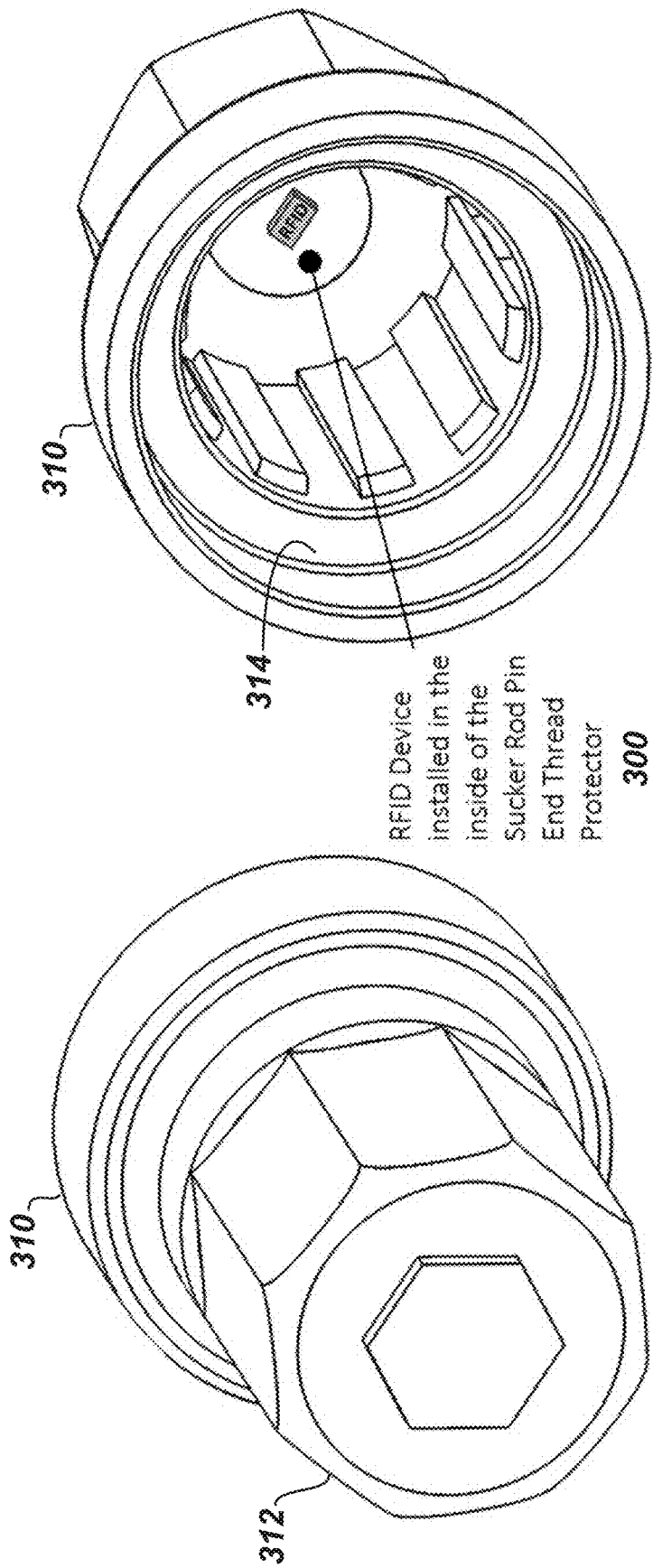

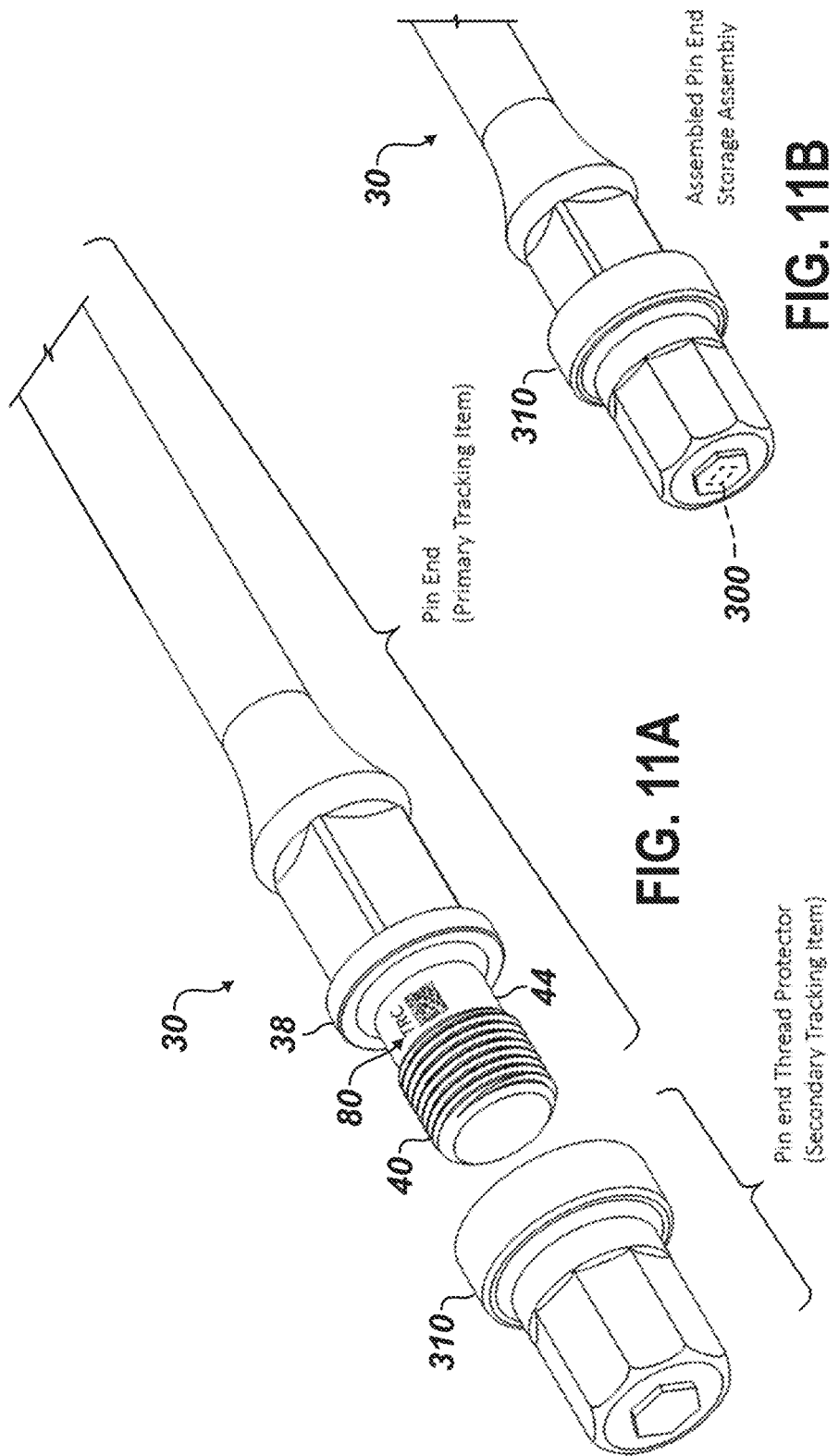

Close End Tubular Coupling End Thread Protector Side (Internal Pipe Side)

RFID Device installed in the inside of the Tubular Thread Protector

Open End Tubular Coupling End Thread Protector Side (exposed to elements)

SUCKER ROD AND TUBULAR IDENTIFICATION AND TRACKING

CROSS-REFERENCE TO RELATED APPLICATIONS

This application claims the benefit of U.S. Provisional Appl. No. 63/528,717 filed Jul. 25, 2023 and claims the benefit of U.S. Provisional Appl. No. 63/472,063 filed Jun. 9, 2023, which are both incorporated herein by reference.

BACKGROUND OF THE DISCLOSURE

Sucker rods are used for pump systems, such as sucker rod pumps or progressive cavity pumps, which extract fluids from a well and employ a downhole pump connected to a driving source at the surface. These rods are typically between 25 and 40 feet (7 to 12 meters) in length and are threaded at both ends. A rod string of sucker rods connects the surface driving force to the downhole pump in the well. In a reciprocating pump system, the downhole pump can be a positive displacement pump that utilizes a standing valve and a travelling valve. When operated, the driving source cyclically raises and lowers a downhole plunger, and with each stroke, the downhole pump lifts well fluids toward the surface.

For example, FIG. 1 shows a reciprocating pump system 10 used to produce fluid from a wellbore. A downhole pump 14 has a barrel 16 with a standing valve 24 located at the bottom. The standing valve 24 allows fluid to enter from the wellbore, but the standing valve 24 does not allow the fluid to leave. Inside the pump's barrel 16, a plunger 20 has a traveling valve 22, which allows fluid to move from below the plunger 20 to the production tubing 18 above, but the traveling valve 22 does not allow fluid to return from the production tubing 18 to the pump's barrel 16 below the plunger 20. A driving source (e.g., a pump jack or a pumping unit 26) at the surface connects by a rod string 12 to the plunger 20 and moves the plunger 20 up and down cyclically in upstrokes and downstrokes to lift fluid to the surface.

As shown in FIG. 1, the rod string 12 is comprised of multiple sucker rods 30 connected end-to-end by couplings 50. The sucker rods 30 and the couplings 50 have standards for their design, manufacture, and assembly from the American Petroleum Institute (API).

Details of how a coupling 50 connects sucker rods 30 together are shown in FIG. 2. The sucker rods 30 typically include a length of a rod body 32, such as a steel bar or rod, having pin ends 40 that are upset and forged onto the sucker rod 30. After forging, the sucker rod 30 is heat treated, and thread rollers are utilized to thread the pin ends 40 of the sucker rod 30. The coupling 50 threads to the pin ends 40 to connect the sucker rods 30 end-to-end.

Being able to trace and monitor the usage of sucker rods and tubulars is of great interest to Oil and Gas producing companies. In the case of sucker rods, markings on the sucker rods are used in the typical approach to track the sucker rods. Because sucker rods are exposed to downhole conditions, including corrosive fluids, wear, erosion, etc., retaining markings on any of the exposed surfaces of the sucker rod can be difficult. In the past, manufacturers have achieved long-lasting markings on sucker rods by forging stamps having information, such as codes and dates, to the wrench flat section of the rod end. The indentations created on the sucker rod by a forged stamp can potentially create stress areas and can serve as initiators for fatigue failures. Other solutions require post-manufacture machining of the sucker rods. However, stamps or other markings that are applied by cold-working or machining the material of the sucker rod 30 are not desired because they alter the structure of the sucker rod 30 and can potentially create stress areas and serve as initiators for fatigue failures.

In any event, typical stamps can only contain limited information about the manufacturing of the sucker rods. In particular, the forged stamp typically provides limited information, such as a manufacturing lot number, for the sucker rod. During use, the sucker rods of the same lot can be operated in any number of different wells. Therefore, the forged stamp cannot be used for tracking run times of specific sucker rods nor for monitoring post-manufacture information, such as inspection, remanufacturing, special treatment, etc., for the specific sucker rods.

Other solutions require affixing an electronic device or tracer that can be lost in operation. Furthermore, these solutions may require special readers to read data. This can be particularly problematic in field applications.

To provide more information about the sucker rods, for example, operators have used radio frequency identification (RFID) tags to trace and monitor sucker rods. In one example, US20220067641 describes a system for managing well production equipment, namely sucker rods. RFID tags are affixed to, attached to, or connected to the sucker rods. An RFID tag reader associated with a production well can be positioned to read the RFID tags as the sucker rods are run into the production well.

In another example, US20120075114 describes an intelligent monitoring system for sucker rods. The system includes a monitor center, a remote wireless communication equipment, movement detection and storage equipment of the sucker rod, an RFID reader/writer, and an RFID storage chip. The movement detection and storage equipment of the sucker rod is connected with the RFID reader/writer, and the RFID storage chip is disposed on the sucker rod to store the information about the sucker rod. The monitoring system can detect and record reciprocating or circumvolving movement of the sucker rod as well as the motion state of the sucker rod in an oil well.

U.S. Pat. No. 7,014,100B2 describes using RFID to identify and track assets, such as tubulars, equipment, tools, and/or devices. US20230077614A1 describes embedding a radio frequency identification RFID tag on tubular strings, pipes, or casings by machining a groove or intention towards the end of the fadeaway of the upset.

Although the use of RFID tags may be useful and provide sufficient information for tracking and monitoring usage of sucker rods, the techniques used to affix, attach, or connect the RFID tags to the sucker rods can be cumbersome, can require physical modifications to the sucker rods, can be prone to damage, or can be subject to other detrimental effects.

For tubulars as with the sucker rods, almost all the surface of a tubular will be exposed to the well conditions that will prematurely wear out most identifications. This is especially true for those tubulars that can be retrieved from a well and re-used. The primary method for tubular identification used by manufacturers involves painting stenciled markings of the tubular's surface. The stenciled markings are quickly lost in operation. Therefore, for any reusable tubular, operators are left with no reference of the used tubular's manufacturing origin or traceability if only stenciled markings are used.

In terms of inventory management, both pieces of equipment are manually counted and controlled with legacy inventory management systems that rely on the knowledge of the products by yard operators so inventory can be controlled efficiently.

The subject matter of the present disclosure is directed to overcoming, or at least reducing the effects of, one or more of the problems set forth above.

SUMMARY OF THE DISCLOSURE

A method disclosed herein comprises providing an endpiece for a sucker rod, the endpiece at least including wrench flats, a shoulder adjacent to the wrench flats, and a pin end having a threaded area and extending from the shoulder; and applying an indicium to a surface on the pin end, the indicium being optically-coded and being machine-readable.

In a first configuration, providing the endpiece can include providing the endpiece having a receptacle defined therein; and wherein the method comprises affixing the receptacle of the endpiece on a rod body for the sucker rod.

In a second configuration, providing the endpiece can include providing the sucker rod having the endpiece disposed on a rod body of the sucker rod.

In a third configuration, providing the endpiece can include forming the endpiece on a rod body of the sucker rod, and threading a threaded area on the pin end. Forming the endpiece can include forging the endpiece directly on an upset at a rod end of the rod body composed of metal material. After forging, the method can include heat treating the sucker rod at least before applying the optically-coded machine-readable indicium. Further, forming the endpiece on the rod body of the sucker rod can include forming the endpiece on each rod end of the rod body.

In a fourth configuration, providing the endpiece can include: forming the endpiece as a separate component from a rod body of the sucker rod; threading a threaded area on the pin end; and affixing the endpiece on the rod body for the sucker rod. Forming the endpiece can include forming the endpiece with a receptacle defined therein, and affixing the endpiece on the rod body for the sucker rod can include affixing the receptacle of the endpiece on a rod end of the rod body for the sucker rod.

Affixing the receptacle of the endpiece on the rod end of the rod body for the sucker rod can include: applying an adhesive to at least one of the rod end and the receptacle; installing the rod end into the receptacle; setting the adhesive therebetween; and applying a tensile load between the rod end and the endpiece up to a tensile threshold. Setting the adhesive can include at least one of a) applying a curing agent to the adhesive, b) allowing the adhesive to set for a period of time, c) applying heat to the adhesive, and d) applying pressure to the adhesive. Affixing the receptacle of the endpiece on the rod end of the rod body for the sucker rod can include wedging the adhesive in annular ramped profiles defined between the receptacle and the rod end.

In the third and fourth configurations, threading the threaded area on the pin end can be performed before or after applying the optically-coded machine-readable indicium. Threading the threaded area on the pin end can include using a thread roller utilized to thread the threaded area on the pin end.

In a fifth configuration, providing the endpiece can include refurbishing a used endpiece for the sucker rod. Applying the optically-coded machine-readable indicium can include at least one of: applying a new indicium on the used endpiece that lacks an existing indicium; applying a new indicium on the used endpiece that has an existing indicium, and leaving the existing indicium; applying a new indicium on the used endpiece that has an existing indicium, and removing the existing indicium; and applying a new indicium on the used endpiece that has an existing indicium, and marking over the existing indicium.

In any of the previous configurations, applying the optically-coded machine-readable indicium to the surface on the pin end can include applying the optically-coded machine-readable indicium to at least one of: a first surface disposed on the pin end and configured to be covered by a coupling utilized on the pin end; a second surface disposed on an undercut area located on the pin end between the threaded area and the shoulder; and a third surface disposed on a distal face on the pin end.

A sucker rod disclosed herein can be manufactured by the method according to any one of previous configurations.

A sucker rod disclosed herein can have at least one endpiece manufactured by the method according to any one of the previous configurations.

Another method disclosed herein is used for a tubular and comprises: providing a coupling for the tubular, the coupling having first and second ends, each of the first and second ends at least including internal thread and a counterbore area; applying a optically-coded machine-readable indicium to a surface on the counterbore area of the first end; and threading the threaded area of the second end of the coupling onto a pin end of the tubular. Providing the coupling for the tubular can include forming the coupling for the tubular.

A tubular disclosed herein can have at least one coupling manufactured by the method described above.

In any of the previous methods and configurations, applying the optically-coded machine-readable indicium to the surface can include laser annealing the optically-coded machine-readable indicium to the surface. Moreover, applying the optically-coded machine-readable indicium to the surface in any of the previous methods and configurations can include: laser ablating the optically-coded machine-readable indicium to the surface; removing portion of a mask on the surface using a laser beam and applying a chemical etchant to the surface exposed by the unmasked portion; laser forming the optically-coded machine-readable indicium on the surface; marking the surface with the optically-coded machine-readable indicium using an ultraviolet laser beam; or applying a compound to the surface, and ablating a layer of the compound using a $CO_2$ laser beam.

In any of the previous methods and configurations, applying the optically-coded machine-readable indicium can include applying at least one of a unique serial number, an optically-coded machine-readable code, a scannable code, a quick response (QR) code, a bar code, and a two-dimensional matrix code.

In any of the previous methods and configurations, applying the optically-coded machine-readable indicium can include associating the optically-coded machine-readable indicium with component information related to the sucker rod or the tubular. Associating the optically-coded machine-readable indicium with the information related to the sucker rod or the tubular can include: encoding the component information directly into the optically-coded machine-readable indicium; and/or linking the optically-coded machine-readable indicium to the component information stored separately. For example, the methods and configurations can further include confirming application of the optically-coded machine-readable indicium to the surface by reading the optically-coded machine-readable indicium using an optical reader. Moreover, the methods and configurations can further include tracking usage of the sucker rod or the tubular by using the component information associated with the optically-coded machine-readable indicium and related to the sucker rod or the tubular. The component information related to the sucker rod or the tubular can include at least one of a serial number, an identifier, a lot number, a place of manufacture, a manufacturer, a manufacture date, a material, a usage history, a total run-time, a refurbishment status, and an age of the sucker rod or the tubular.

A method disclosed herein is used with a threaded wellbore component configured to connect in an end-to-end assembly for use in a wellbore. The method comprises associating primary coded information with the threaded wellbore component by applying an optically-coded machine-readable indicium adjacent a threaded area of the threaded wellbore component; associating secondary coded information with the threaded wellbore component by applying a machine-readable device on a thread protector for use on the threaded area of the threaded wellbore component; and tracking the threaded wellbore component by linking the primary coded information to the secondary coded information.

In one configuration, the threaded wellbore component can include a sucker rod having an endpiece, the endpiece at least including wrench flats, a shoulder adjacent to the wrench flats, and a pin end extending from the shoulder. Applying the optically-coded machine-readable indicium adjacent the threaded area of the threaded wellbore component can include applying the optically-coded machine-readable indicium to at least one of: a first surface disposed on the pin end and configured to be covered by a coupling utilized on the pin end; a second surface disposed on an undercut area located on the pin end between the threaded area and the shoulder; and a third surface disposed on a distal face on the pin end.

In another configuration, the threaded wellbore component can include a tubular having a coupling, the coupling having first and second ends, each of the first and second ends at least including the internal thread and a counterbore area. Applying the optically-coded machine-readable indicium adjacent the threaded area of the threaded wellbore component can include applying the optically-coded machine-readable indicium to a surface on the counterbore area of the first end.

In the method and configurations for the threaded wellbore component, applying the machine-readable device on the thread protector for use on the threaded area of the threaded wellbore component can include: affixing a radio frequency identification (RFID) device on a surface of the thread protector, optionally wherein the surface is configured to install in a bore of the tubular; or embedding the radio frequency identification (RFID) device in the thread protector.

In the method and configurations for the threaded wellbore component, tracking the threaded wellbore component can include: optically reading the optically-coded machine-readable indicium adjacent the threaded area of the threaded wellbore component with the treaded protector removed; and electronically reading the machine-readable device on the thread protector present on the threaded area of the threaded wellbore component.

A system is disclosed herein for monitoring threaded wellbore components configured to connect in an end-to-end assembly in a wellbore, the system comprises first and second databases, an input interface, and a processing unit.

The first database stores primary coded information associated individually with the threaded wellbore components. The primary coded information is associated with optically-coded machine-readable indicia applied adjacent threaded areas of the threaded wellbore components. The second database stores secondary coded information associated individually with secondary coded information with the threaded wellbore component. The secondary coded information is associated with machine-readable devices applied on thread protectors for use on the threaded area of the threaded wellbore component.

The input interface is configured to obtain first read information read from the optically-coded machine-readable indicia and is configured to obtain second read information read from the machine-readable device. The processing unit is in operable communication with the first and second databases and the input interface. The processing unit is configured to: link the primary coded information to the secondary coded information; and track the threaded wellbore component based on the first and second read information relative to the linked primary and secondary coded information.

The foregoing summary is not intended to summarize each potential embodiment or every aspect of the present disclosure.

BRIEF DESCRIPTION OF THE DRAWINGS

FIG. 1 illustrates a reciprocating rod pump system according to the prior art.

FIG. 2 is an elevational view of forged sucker rod ends for connecting together with a coupling.

FIG. 3 illustrates a perspective view of a rod end of a sucker rod according to the present disclosure.

FIGS. 4A-4B illustrate perspective views of sucker rods being connected with a sucker rod coupling according to the present disclosure.

FIGS. 10A-10B illustrate perspective views of an outside and inside of a thread protector for a sucker rod having a form of secondary coded information according to the present disclosure.

FIGS. 11A-11B illustrate perspective views of a thread protector on a sucker rod.

DETAILED DESCRIPTION OF THE DISCLOSURE

Figure 5:
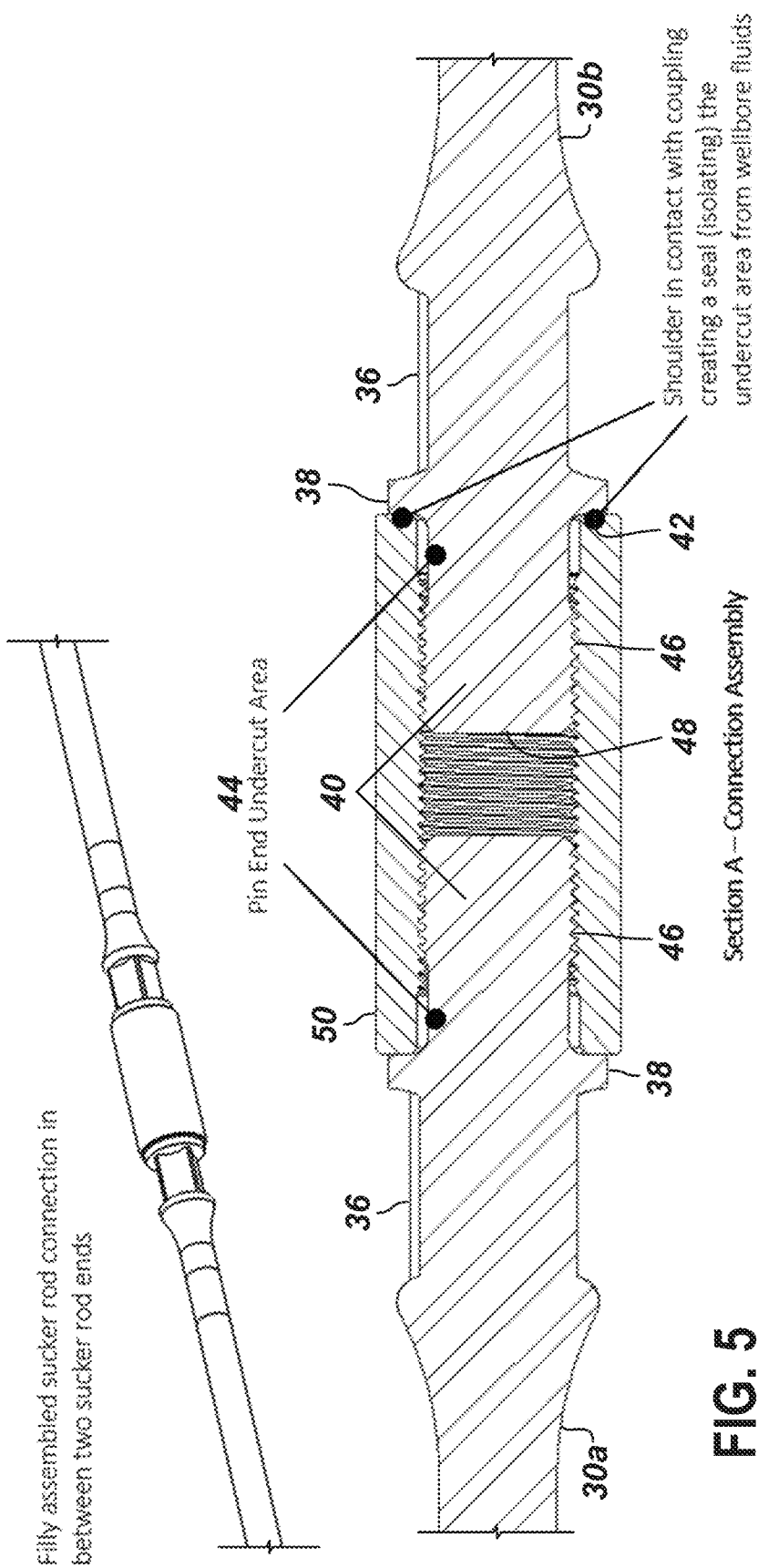
FIG. 5 illustrates a cross-sectional view of sucker rods connected with a sucker rod coupling according to the present disclosure.

FIG. 3 illustrates a perspective view of a rod end of a sucker rod 30 according to the present disclosure. The sucker rod 30 includes a rod body 32 having an endpiece 34 on the rod's end. Only one end of the sucker rod 30 is shown here. The other end can have a comparable endpiece 34.

In the present example, the endpiece 34 is integrally formed on the rod body 32, such as through forging. The endpiece 34 transitions at an upset bed 35 to wrench flats 36, which are used for gripping the sucker rods during coupling and uncoupling of the sucker rod 30. A pin shoulder 38 separates the wrench flats 36 from a pin end 40, which extends from the pin shoulder 38. The pin end 40 provides a threaded pin connection, such as an API standard connection. The pin end 40 includes a shoulder area 42 on the pin shoulder 38 and includes a threaded area 46 on the distal end of the pin end 40. An undercut area 44 on the pin end 40 separates the threaded area 46 from the shoulder area 42. The pin end 40 terminates at a distal end face 48.

An optically-coded machine-readable indicium 80, marking, code, or other distinctive indicia ("coded indicium") according to the present disclosure is applied to the endpiece 34 of the sucker rod 30. As discussed below, the coded indicium 80 can be used for tracking and monitoring information related to the sucker rod 30 as discussed below. As shown here, the coded indicium 80 is preferably included on the pin end 40 of the endpiece 34 and is more preferably included on an undercut area 44.

FIG. 4A illustrates a perspective view of sucker rods 30*a-b* being connected with a sucker rod coupling 50 according to the present disclosure. Meanwhile, FIG. 4B illustrates a perspective view of the sucker rods 30*a-b* connected with the coupling 50. As shown, pin ends 40 of adjoining sucker rods 30*a-b* are connected together by a coupling 50 to create a rod string, which is comprised of multiple sucker rods connected end-to-end by such couplings 50. The sucker rods 30*a-b* and the couplings 50 have standards for design, manufacture, and assembly from the American Petroleum Institute (API).

FIG. 5 illustrates a cross-sectional view of the sucker rods 30*a-b* connected with the coupling 50 according to the present disclosure. As shown, the threaded area 46 of the pin ends 40 thread inside the coupling 50. The shoulder areas 42 of the pin shoulders 38 engage the edges of the coupling 50 with a friction fit. As can be seen, the undercut areas 44 of the pin ends 40 remain enclosed or covered by the coupling 50 engaged with the shoulder areas 42. The coded indicium 80—can be marked in the undercut area 44 on one or both of the pin ends 40 for each sucker rod 30 and can be used for tracking the sucker rod 30 of the present disclosure. As an alternative or additional area, the coded indicium (80) can be marked on the distal end face 48 of the pin end 40, which lies inside the coupling 50 when the pin ends 40 are made up.

During connection of the sucker rods 30*a-b* with the coupling 50, a small amount of sucker rod lubricant is applied to the threaded area 46 of the sucker rods 30*a-b*. Some procedures may instead call for applying lubricant to the threads of the coupling 50. The connections between the coupling 50 and the pin ends 40 on the adjoining sucker rods 30*a-b* are tightened together until hand-tight. A vertical line is drawn across the top end of the coupling 50 and the pin shoulder 38 of the upper sucker rod 30. A Circumferential Displacement (CD) card placed at the connection is then used to measure and draw another vertical mark on the pin shoulder 38 in the direction for tightening. This procedure is repeated for the bottom end of the coupling 50 and the lower sucker rod 30 held at the well floor with a gripper. A power tong is then used to complete the tightening, and operators use the marked circumferential displacement to turn the connection to a proper preload.

The sucker rod connection is a rotary-shouldered, friction-loaded connection with the pin end 40 given a preload. As long as the applied load during use remains less than the pin preload, the load in the connection remains constant and does not suffer from fatigue due to the cyclic loads. Should the preload to the pin ends 40 be insufficient, however, higher applied loads can cause the coupling 50 and ends of the rods 30*a-b* to separate under the cyclic operation, eventually leading to failure. Any stress areas, inconsistencies, surface changes in the pin end 40 can produce stress points that can lead to failure. Therefore, the coded indicium 80 of the present disclosure disposed on the pin end 40 (and particularly to the undercut area 44 or distal end face 48) is preferably applied using a non-contact process or at least using a process that is non-damaging or that does not detrimentally impact the microstructure of the pin end 40.

Figure 6A:
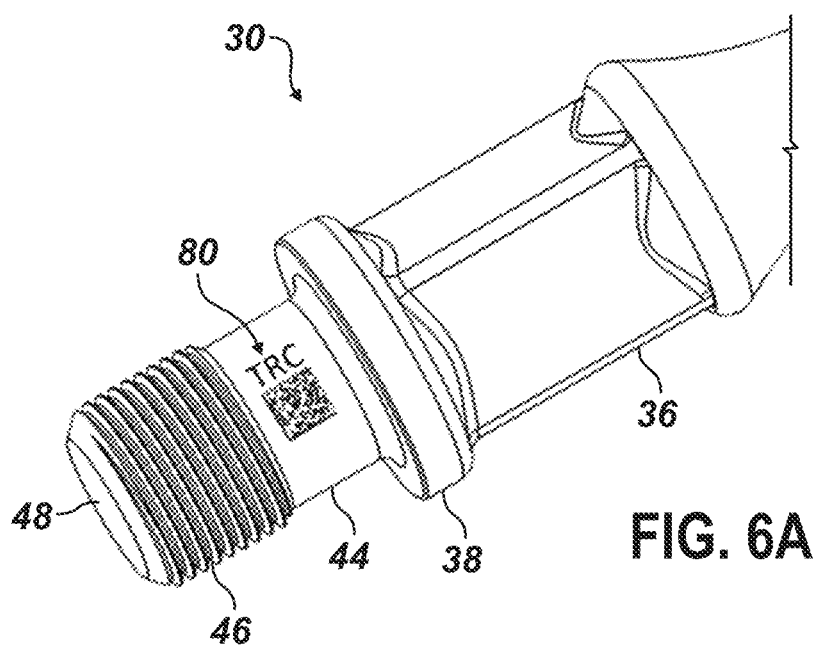
FIGS. 6A-6C illustrate various view of distinctive markings on an undercut area of a pin end for a sucker rod according to the present disclosure.
Figure 6B:
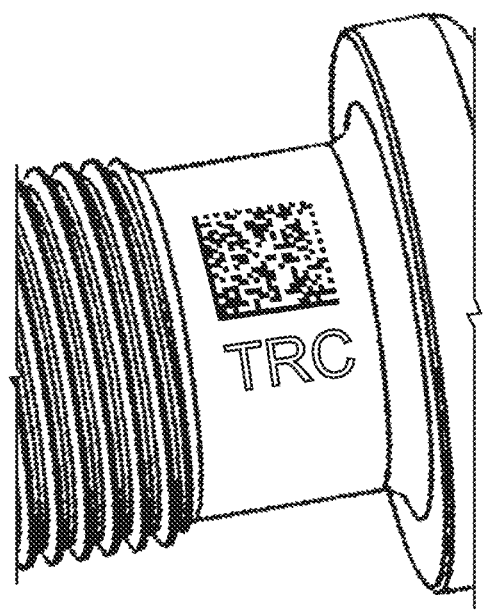
Figure 6C:
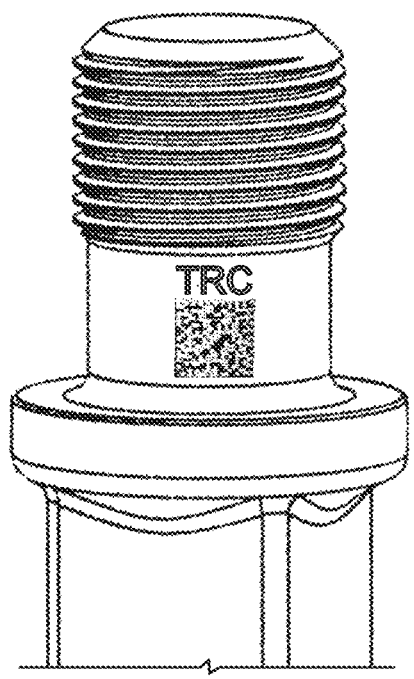

As an example, FIGS. 6A-6C illustrate various views of coded indicium 80 on the undercut area 44 of the pin end 40 according to the present disclosure.

The coded indicium 80 in its simplest form can include a unique serial number for the particular sucker rod 30. The coded indicium 80 can include a scannable code, such as a quick response (QR) code, a bar code, or other two-dimensional matrix code. An optical reader, camera, laser scanner, or the like can be used to scan or read the code of the coded indicium 80, which can encode a particular serial number and other identifying information associated with the sucker rod 30. The encoded information can include a unique serial number and various details of the sucker rod's manufacture (lot number, place of manufacture, manufacturer, manufacture date, material, refurbishment date, prior usage history, etc.). The encoded information can also be used to access stored information in a database used in monitoring and tracking the sucker rod 30, its usage, its run-time, its refurbishment, age, etc. The coded indicium 80 can encode information directly into the two-dimensional matrix. Additionally or alternatively, the coded indicium 80 may encode a link, pointer, or identifier directed to stored information in a database.

The coded indicium 80 can be added during manufacture of the sucker rod 30 and can be used from then on to track and monitor the life of the sucker rod 30. Additional indicia 80 can be applied at later times, encoding new or additional information, when the sucker rod 30 is serviced or reused.

Preferably as noted, the coded indicium 80 is applied using a non-contact process (i.e., that does not involve physical contact, stamping, cold working, etc.) or is applied using a process that is non-damaging (i.e., that does not detrimentally impact the microstructure, surface finish, and/or geometry of the pin end 40). For example, a laser marking process can be used to apply the coded indicium 80. One particular laser making process that can be used includes laser annealing, which is described below.

Using the laser marking technology (e.g., laser annealing), operators can properly identify and trace sucker rods 30 by the coded indicium 80 (e.g., scannable code, QR code, or other two-dimensional matrix code). The undercut area 44 between the shoulder area 42 and the threaded area 46 of the pin end 40 is not usually in contact with the downhole damaging environment (wellbore fluids). The undercut area 44 is concealed inside of the sucker rod coupling 50, which can keep the coded indicium 80 from exposure so the indicium 80 can be readable on the sucker rod 30 after being in use.

In the previous example, the endpiece 34 is integrally formed on the rod body 32 through a process of forging and machining. The techniques of the present disclosure can apply to other types of sucker rods.

Figure 7A:
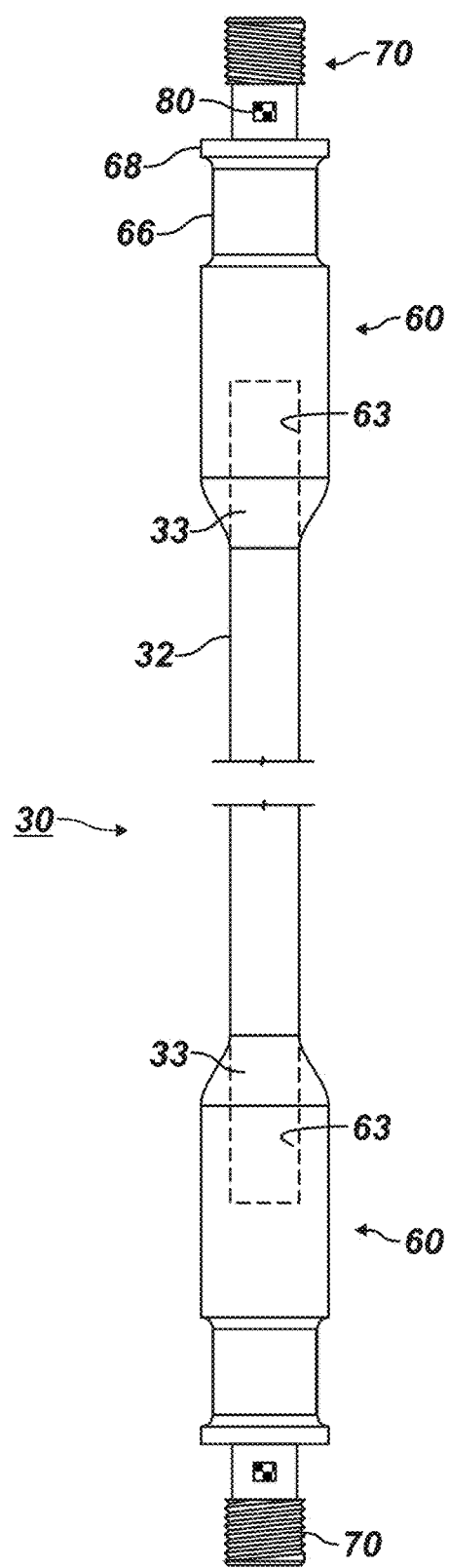
FIG. 7A is an elevational view of an assembled sucker rod with adhesive-attached endpieces according to the present disclosure.
Figure 7B:
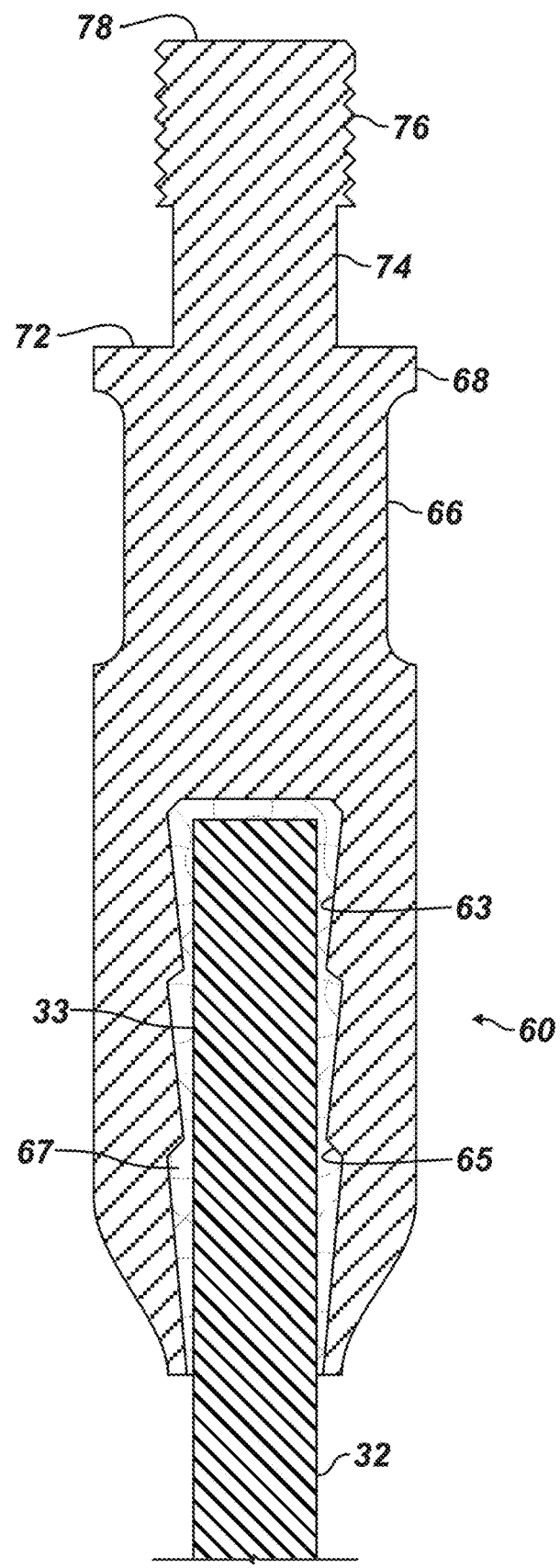
FIG. 7B is cross-sectional view of a portion of the assembled sucker rod and the adhesive-attached endpiece of FIG. 7A.

For example, FIG. 7A illustrates an elevational view of an assembled sucker rod 30 according to the present disclosure, and FIG. 7B shows one end of the assembled sucker rod 30 in cross-section. The sucker rod 30 includes a rod body 32 having rod ends 33. The sucker rod 30 includes assembled joints, end fittings, or endpieces 60 each having a recess or receptacle 63 configured to receive one of the rod ends 33 of the rod body 32.

The endpiece 60 has wrench flats 66, which are used for gripping the sucker rods during coupling and uncoupling of the sucker rod 30. A shoulder 68 separates the wrench flats 66 from a pin end 70, which extends from the shoulder 68. The pin end 70 includes a shoulder area 72 on the shoulder 68 and includes a threaded area 76 on the distal end of the pin end 70. An undercut area 74 on the pin end 70 separates the threaded area 76 from the shoulder area 72. The pin end 70 terminates at an end face 78.

To affix the endpiece 60 to the rod body 32, an adhesive 67 is configured to secure the endpiece 60 to the rod end 33 of the rod body 32. The receptacle 63 includes wedged features or profiles 65 so the adhesive 67, once cured, adheres to the rod body 32 and forms an internal wedge system with the wedged profiles 65 of the receptacle 63. This wedge system locks the endpiece 60 under a tension (positive) load on the rod body 32.

As before, a coded indicium 80 according to the present disclosure is applied to the endpiece 60 of the sucker rod 30. As shown here, the coded indicium 80 is preferably included on the pin end 70 of the endpiece 60 and is more preferably included on the undercut area 74.

Figure 8A:
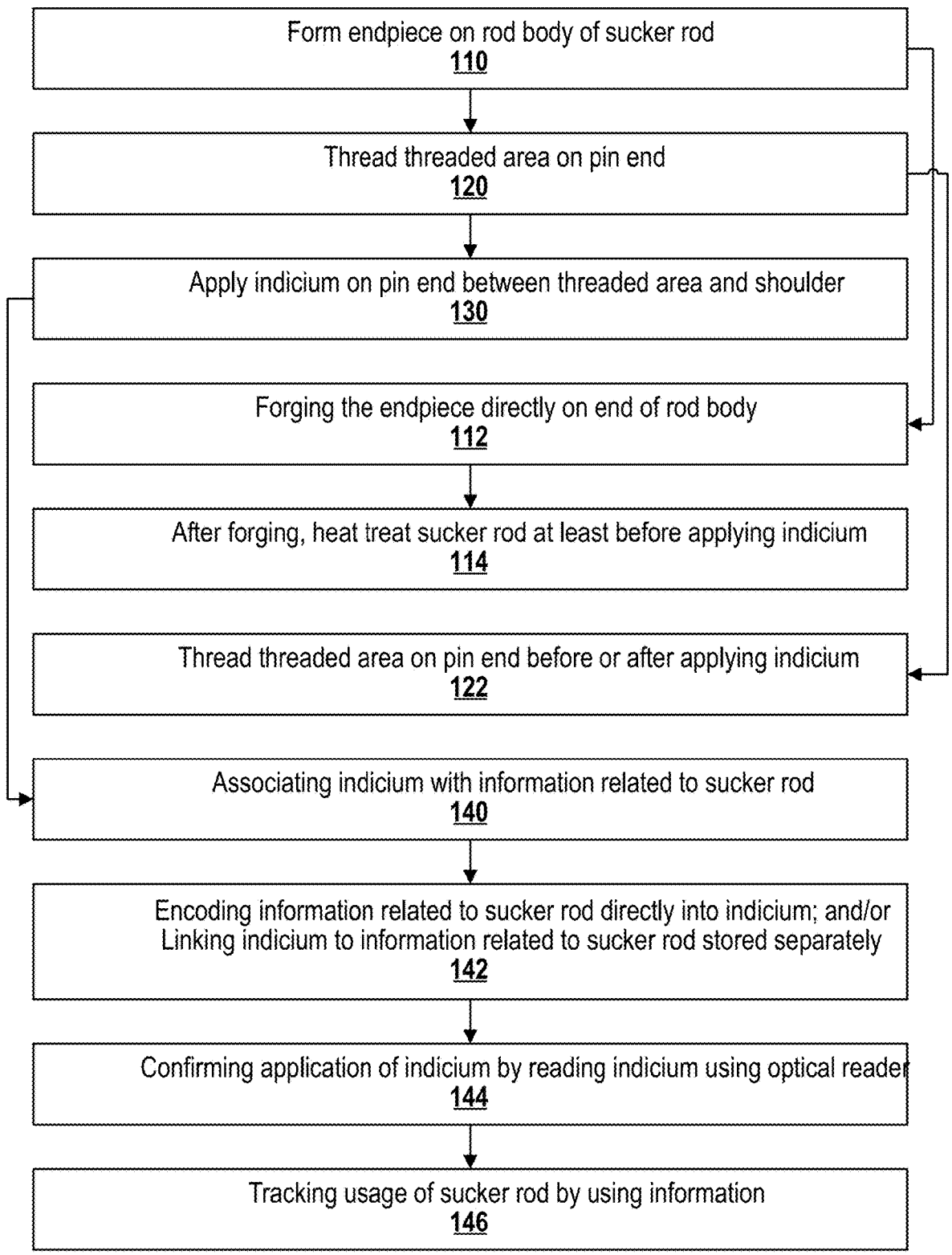
FIGS. 8A-8B show methods of manufacturing a sucker rod according to the present disclosure.
Figure 8B:
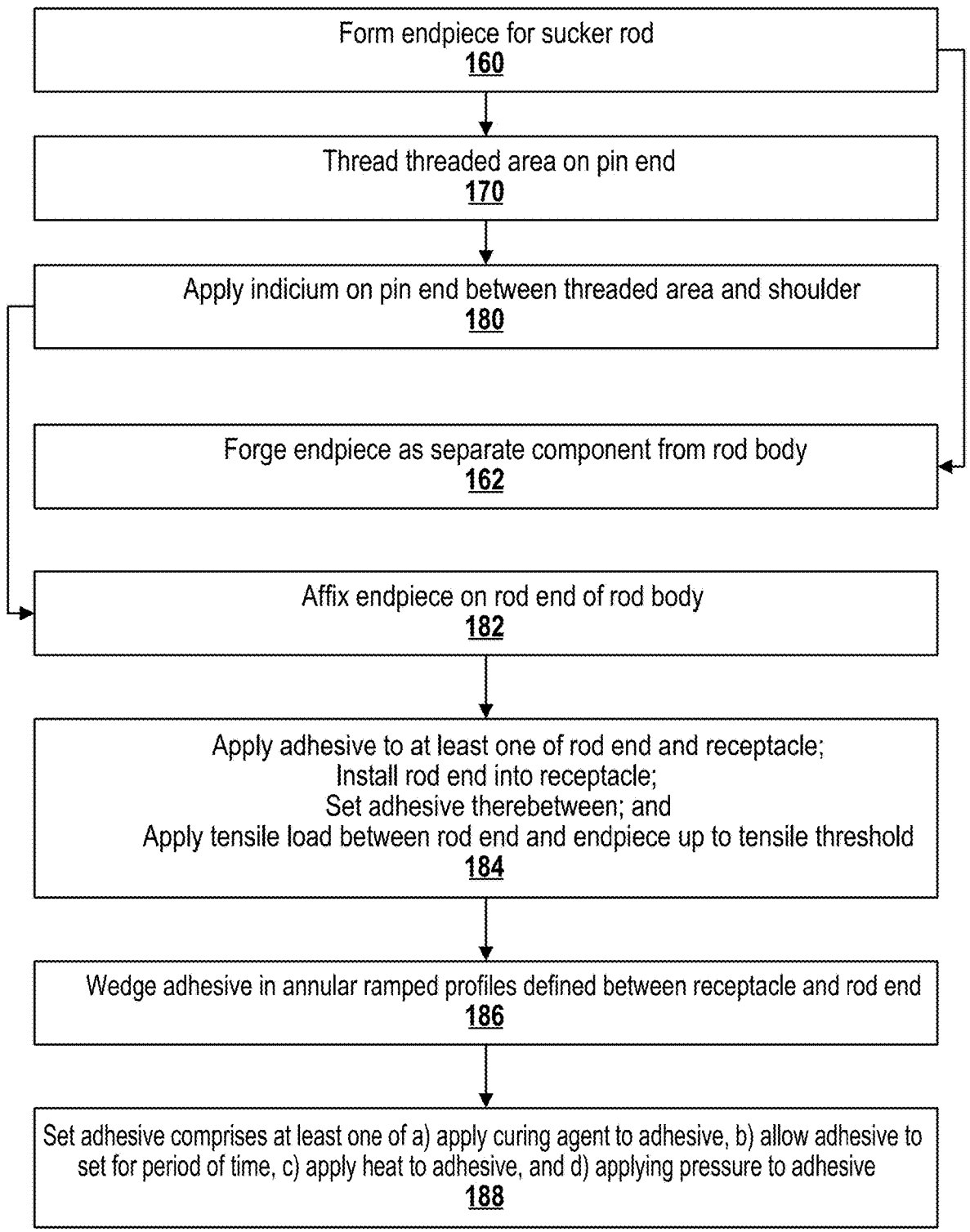

FIGS. 8A-8B illustrate methods 100 and 150 of manufacturing a sucker rod 30 according to the present disclosure. Steps of the methods 100 and 150 may be performed at a manufacturing facility using appropriate equipment.

As shown in FIG. 8A, the method 100 may include forming an endpiece on a rod body of the sucker rod. The endpiece at least includes wrench flats, a shoulder adjacent to the wrench flats, and a pin end extending from the shoulder (Step 110). For example, an endpiece 34 as shown in FIGS. 2 through 5 may be formed directly on an end of a rod body 32 for sucker rod 30. The endpiece 34 at least includes wrench flats 36, a pin shoulder 38 adjacent to the wrench flats 36, and a pin end 40 extending from the pin shoulder 38, as described above. To form the endpiece 34, the endpiece 34 can be forged directly on an upset at an end of the rod body 32 composed of metal material (Step 112). For a typical sucker rod 30, comparable endpieces 34 can be formed on each of the opposing ends of the rod body 32.

In some implementations, the sucker rod 30 can be heat treated after forging, and the heat treatment can be performed before any machining or marking is performed as described below (Step 114). For example, after the forging process, the sucker rod 30 can be heat treated in an effort to reduce residual stresses and other potential defects and/or stress concentrators that can be introduced into the rod body 32 and/or the endpiece 34 during the forging process.

After the endpiece is formed, the method 100 may include threading a threaded area on the pin end (Step 120). For example and as shown in FIG. 2 through 5, a threaded area 46 (i.e., pin thread or threaded section) may be formed on the pin end 40, as described above by using a thread roller (not shown) to cut the threads on the pin end 40. Other machining steps can be performed as needed.

As further shown in FIG. 8A, the method 100 may include applying an indicium to a surface on the pin end between the threaded area and the shoulder (Step 130). For example and as described above in FIGS. 2 through 6C, a coded indicium 80 can be added to a surface of an undercut area 44 located on the pin end 40 between the threaded area 46 and the shoulder area 42, as described above. Threading of the threaded area 46 on the pin end 40 can be performed before or after applying the coded indicium 80.

The coded indicium 80 may include at least one of a unique serial number, a scannable code, a quick response (QR) code, a bar code, and a two-dimensional matrix code. Applying the coded indicium 80 may use laser annealing, laser marking, laser engraving, or other processes to apply the indicium 80 to the surface.

In a laser annealing process, the pin end 40 is modified by subjecting its surface to a high-intensity laser beam to produce the coded indicium 80. The annealing can be performed using a laser as a heat source. The annealing can involve oxidizing the material at the surface of the pin end 40 by the heating and controlled cooling of the material. The controlled heating of the steel surface on the pin end 40 induces oxidation without melting or vaporizing the material, resulting in a change in color.

The laser used in the laser annealing process can be a high-energy pulsed laser, such as an excimer laser or a solid-state laser. The laser emits short bursts of intense light with a specific wavelength, which can be precisely controlled and focused onto the surface of the pin end's material. The energy of the laser beam is absorbed by the material, causing localized heating. During the annealing process, the laser rapidly heats the material to a temperature below its melting point but high enough to induce oxidization in the metal. The precise temperature and duration of the laser exposure are controlled to achieve the desired results.

Once the laser annealing is cooled, a change in color is produced for the metal surface. The resulting color depends on the temperature at which the particular metal is heated. Metals suitable for laser annealing include metals, such as steel and titanium, which change color in response to heat and oxygen. Aluminum or non-ferrous metals are not suitable. Subjecting the laser annealed marking of the coded indicium 80 to a temperature above a stable temperature value, such as approximately 200 deg. C., will remove the oxidation and return the surface to the resulting surface finish. Accordingly, the coded indicium 80 of the present disclosure can be removed by heating above the stable temperature of the marking. This may have benefit in refurbishing sucker rods and endpieces and placing new coded indicium 80.

For an endpiece composed of stainless steel, the laser annealing can remove areas of the existing chromium oxide layer from the metal's surface. However, a new passivation layer is spontaneously created to provide protection of the metal. The laser annealing and resulting passivation can be controlled so a readable marking is produced on the metal surface that is still sufficiently protected from corrosion.

The laser annealing process can provide high precision so minute details can be produced in the coded indicium 80. Additionally, when produced by the laser annealing process, testing shows that the coded indicium 80 can be generally permanent and can resist fading, abrasion, and chemicals. In this way, the laser annealed coded indicium 80 can withstand harsh environments and maintain its legibility over time.

Other processes can be used according to the present disclosure to produce the coded indicium 80. As noted, the process is preferably a non-contact process or is a process that is non-damaging (i.e., does not detrimentally impact the microstructure, surface finish, and/or geometry of the pin end 40). Some of the processes discussed below may be more or less "non-contact"/"non-damaging" than others discussed below.

Similar to laser annealing, other laser marking processes can be used to produce the coded indicium 80. In laser marking, for instance, as the laser beam can scan across the surface of the pin end 40, the laser beam heats and melts a thin layer of the material. This molten layer then cools rapidly, typically within microseconds, due to the high thermal conductivity of the surrounding material. This rapid cooling prevents the formation of large crystal grains, resulting in a fine-grained microstructure. By controlling the laser parameters, surface properties like roughness, hardness, and reflectivity can be altered to meet specific requirements.

Ultraviolet (UV) laser marking can be used to produce the coded indicium 80. In this process, UV lasers emit light in the ultraviolet range, enabling precise material removal or color change on the steel surface without causing thermal damage. This UV laser marking process can offer sharp contrast, resolution, and durability for permanent markings.

Similar to laser annealing, rapid thermal annealing (RTA) can be used to produce the coded indicium 80. As with laser annealing, RTA involves the controlled heating and cooling of the material to achieve specific changes. The heating in RTA is achieved using high-intensity lamps or heating elements, which would tend to heat larger areas. The heating can be properly directed to make details of the coded indicium 80 using various techniques. The heating duration in RTA is longer compared to laser annealing, typically ranging from seconds to a few minutes.

In contrast to these annealing and marking processes, the coded indicium 80 can be made on the metal material using laser engraving or ablation. Laser engraving or ablation utilizes a laser beam to remove material from the surface of the metal, creating permanent marks or designs. In laser engraving, a high-energy laser beam is focused onto the metal surface. The laser beam rapidly heats the material, causing it to vaporize or melt. As the laser beam scans across the surface, it removes or ablates the material, leaving behind the desired marks. Therefore, the laser ablation process can use the high-powered laser beam to remove a thin layer of superficial oxides from the steel surface, revealing the bare steel underneath and creating a contrasting mark. The depth and appearance of the marks can be controlled by adjusting the laser parameters such as power, speed, and focus.

In contrast to laser ablation or engraving, a laser foaming process can be used to create the coded indicium 80. The laser foaming process uses a laser to generate a heat-induced reaction on the steel surface, causing the material to foam up and create a raised mark. The foam can be a distinct color from the base material, providing a contrasting and permanent mark.

Chemical etching or engraving can also be used to produce the coded indicium 80. Chemical etching or engraving uses chemical reactions to selectively remove material from the surface. An etchant in the form of a chemical solution or mixture is applied to a masked area to dissolve or corrode specific areas of the metal surface. A mask for the masked area can be applied to the metal surface to protect the areas that should not be etched. The mask can be made of various materials, such as photoresist, tape, wax, or adhesive film. The mask can be selectively applied through techniques like printing, stenciling, or photolithography to define the desired pattern or areas for etching. An etchant solution can be sprayed at the area so the etchant can react with the exposed metal surface, selectively removing material in the unmasked areas.

A laser chemical etching process can also be used that combines laser technology with chemical etching. Here, a laser can be used to remove a protective coating or mask so a chemical etchant can be applied to create the mark on the steel surface.

Finally, a process can be used that combines a laser marking solution or a laser marking compound with a $CO_2$ laser beam. In this process, a solution or a compound, which can be a mixture of pigments and binders, is applied to the metal surface. A $CO_2$ laser is then used to engrave or ablate the solution's layer, resulting in a durable and high-contrast mark.

These and other processes can be used to produce the coded indicium 80 so that the metal surface of the endpiece 34 remains unaffected by physical contact or mechanical stress during marking. This reduces the risk of damage or distortion to the material. Physical or mechanical processes, such as stamping or dot peen marking, may not be desired for marking the endpieces according to the present disclosure because such processes can increase residual stresses, introduce potential defects, or create stress concentrators.

The method 100 may include additional implementations, such as any single implementation or any combination of implementations described below and/or in connection with one or more other the methods described elsewhere herein.

In one implementation, alone or in combination with one or more of the other implementations, the coded indicium 80 applied to the endpiece 34 may be associated with information related to the sucker rod 30 (Step 140). For example, associating the coded indicium 80 with the information related to the sucker rod 30 may include: encoding the information related to the sucker rod 30 directly into the coded indicium 80; and/or linking the coded indicium 80 to the information related to the sucker rod stored separately, such as in a database (Step 142). The information related to the sucker rod 30 may include at least one of a serial number, an identifier, a lot number, a place of manufacture, a manufacturer, a manufacture date, a material, a usage history, a total run-time, a refurbishment status, an age of the sucker rod, and other appropriate information and data pertaining to the sucker rod 30 and its usage.

In additional implementations, alone or in combination with one or more of the other implementations, the method 100 may include confirming application of the coded indicium 80 to the surface by reading the coded indicium 80 using an optical reader (Step 144). This can be performed after the coded indicium 80 is applied to ensure that the application was performed correctly and the coded indicium 80 can be properly read. During storage, shipping, usage, refurbishment, and other processes and operations involving the sucker rod 30, the coded indicium 80 can be read using an optical reader. In this way, usage of the sucker rod 30 can then be tracked by using the information associated with the coded indicium 80 and related to the sucker rod 30 (Step 146).

Although FIG. 8A shows example steps of the method 100, in some implementations, the method 100 may include additional steps, fewer steps, different steps, or differently arranged steps than those depicted in FIG. 8A. Additionally, or alternatively, two or more of the steps of the method 100 may be performed in parallel.

FIG. 8B is a flowchart of another example method 150 according to the present disclosure. As shown in FIG. 8B, the method 100 may include forming an endpiece for the sucker rod (Step 160). In this example, an endpiece 60 as shown in FIGS. 7A-7B may be formed for the sucker rod 30. The endpiece 60 at least includes wrench flats 66, a shoulder 68 adjacent to the wrench flats 66, and a pin end 70 extending from the shoulder 68, as described above. In one implementation, forming the endpiece 60 may include forging the endpiece 60 as a separate component from a rod body 32 of the sucker rod 30 (Step 162). In particular, the endpiece 60 is formed with a receptacle 63 defined therein.

As before and as shown in FIG. 8B, the method 150 may include threading a threaded area 76 on the pin end 70 (Step 170). The method 150 may include applying a coded indicium 80 on the pin end 70 between the threaded area 76 and the shoulder area 72 (Step 180). For example, the coded indicium 80 can be applied to a surface of an undercut area 74 located on the pin end 70 between the threaded area 76 and the shoulder area 72, as described above.

The method 150 may include additional implementations, such as any single implementation or any combination of implementations described below and/or in connection with one or more other the methods 100 described elsewhere herein.

In manufacturing the sucker rod 30, the receptacle 63 of the endpiece 60 can be affixed on a rod end 33 of the rod body 32 for the sucker rod 30 (Step 182). Step 184 describes a process to affix the receptacle 63 of the endpiece 60 on the rod end 33 of the rod body 32 for the sucker rod 30. An adhesive 67 can be applied to at least one of the rod end 33 and the receptacle 63. The rod end 33 is installed into the receptacle 63, and the adhesive 67 can then be set. Finally, a tensile load can be applied between the rod end 33 and the endpiece 60 up to a tensile threshold. The adhesive 67 can thereby be wedged in annular ramped profiles 65 defined between the receptacle 63 and the rod end 33 (Step 186).

In general, setting the adhesive 67 may include at least one or more of a) applying a curing agent to the adhesive 67, b) allowing the adhesive 67 to set for a period of time, c) applying heat to the adhesive 67, and d) applying pressure to the adhesive 67 (Step 188).

Although FIG. 8B shows example steps of the method 150, in some implementations, the method 150 may include additional steps, fewer steps, different steps, or differently arranged steps than those depicted in FIG. 8B. Additionally, or alternatively, two or more of the steps of the method 150 may be performed in parallel.

At least some of the steps in the methods 100, 150 of FIGS. 8A-8B can be incorporated into processes for cleaning, inspecting, refurbishing, and remanufacturing sucker rods for reuse in a wellbore. For the steps (130, 140 to 146 and 180, 182 to 188) in the methods 100 and 150 of FIGS. 8A-8B can be incorporated into processes as disclosed in U.S. Pat. Nos. 8,900,372; 8,920,570; 9,272,313; 9,278,412; 9,561,529; 9,840,893; 10,195,699; and 10,781,666 (which are incorporated herein by reference) for cleaning, inspecting, refurbishing, and remanufacturing sucker rods for reuse in a wellbore.

Figure 9:
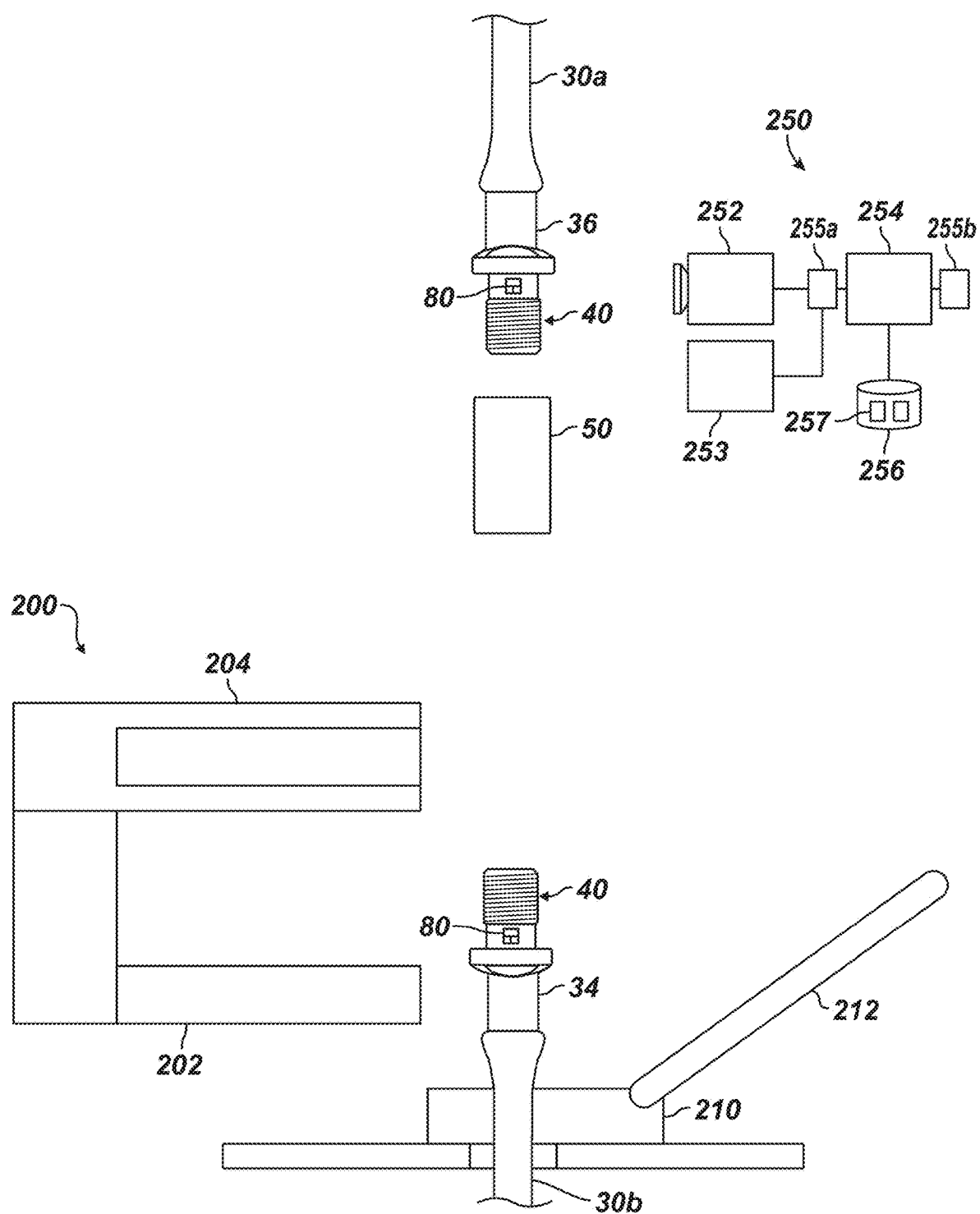
FIG. 9 schematically illustrates a power tong relative to sucker rods and a coupling according to the present disclosure.

FIG. 9 schematically shows a power tong 200 in relation to sucker rods 30*a-b* for connection. A rod elevator 210 grips the lower sucker rod 30*b* and has a hook 212 for lowering the sucker rod 30*b* into the well. An upper sucker rod 30*a* has been hoisted upward using rod elevators (not shown) in a workover rig (not shown), while the lower sucker rod 30*b* is held in place using the rod elevator 210 to prevent the rod assembly from falling into the wellbore.

The coupling 50 is threaded hand tight to the pin ends 40 of the rods 30*a-b*. Manipulating the power tong 200, an operator engages a backup tong jaw 202 with the wrench flats 36 on the lower sucker rod 30*b* below coupling 50 and engages an upper tong jaw 204 against the wrench flats 36 of the upper sucker rod 30*a* above the coupling 50. While lower backup tong jaw 202 prevents rotation of the lower sucker rod 30*b*, the operator actuates the hydraulic system of the power tong 200 to rotate the upper tong jaw 204 to turn the upper sucker rod 30*a* relative to the lower sucker rod 30*b*. Disassembling the sucker rods 30*a-b*, such as when removing a rod string and breaking the connections between the rods 30*a-b* and the couplings 50, would generally follow a reversal of the above steps as understood and are not described.

During the process of assembling and/or disassembling the sucker rods 30*a-b*, a monitoring system 250 can be used to track and monitor the rods 30*a-b*. The monitoring system 250 includes a processing unit 254, an input interface 255*a*, an output interface 255*b*, and memory 256 having database(s) 257. The input interface 255*a* can connect to an optical reader 252 to read information from the coded indicium 80. The optical reader 252, which can be a scanner, camera, etc., reads the coded indicium 80 on at least one pin end 40 of the rods 30*a-b* when being moved at the rig. The processing unit 254 decodes the encoded information of the coded indicium 80 and records details of the encoded information and other operations details of the sucker rod 30*a-b* in the database(s) of the memory 256 for later retrieval and assessment. The output interface 255*b* can include any appropriate interface, such as a display, communication interface, or the like.

The input interface 255*a* can also connect to an electronic reader 253 to read information from an electronic device, such as an RFID device or tag, having secondary information associated with the sucker rod 30. The electronic reader 253, which can be an RFID reader, reads the coded information associated with the rods 30*a-b* either on the rig or when transported and handled. The processing unit 254 decodes the information and records details of the encoded information and other operations details of the sucker rod 30*a-b* in the database(s) of the memory 256 for later retrieval and assessment.

The monitoring system 250 can be a dedicated device on the rig. Alternatively, operators can use a QR reader or a cellphone application to read the sucker rod's historical data and can add information on the rod's profile. For example, the operator can update the rod's use to a different well, can indicate that the rod has been sent for inspection, has experienced a failure, etc.

This innovative approach allows for the precise and permanent marking of sucker rods 30 without causing any significant changes or indentations. By incorporating the coded indicium 80, operators can efficiently track each rod's unique identification and can access comprehensive information about its manufacturing, remanufacturing, and in-use historical data.

The details associated above with respect to sucker rods can be applied to tubulars and other threaded wellbore components configured to connect end-to-end in a wellbore. Further details are discussed below. Moreover, two forms of coded identification can be used according to the present disclosure that allows for proper traceability of threaded wellbore components (e.g., sucker rods and tubulars) whether the component is new, inspected, remanufactured, or reused in well production operations. The two forms of coded identification allow for the sucker rod and tubular components to be counted, managed, and traced at surface (i.e., in yard and in transit operations) with ease and allows for the performance of the sucker rod and tubular components to be evaluated after multiple uses.

The two forms of coded identification disclosed herein use a combination of a primary coded identification (e.g., coded marking) and a secondary coded identification (e.g., coded marking or identification device). The primary coded identification remains with the threaded wellbore components throughout the life of the threaded wellbore components. Meanwhile, the secondary coded identification is placed in a thread protector, allowing for easy access for inventory management purposes. The secondary coded identification is linked to the primary coded identification for system integration or tracing with a database. Both coded identifications can be linked into an inventory and performance system. As disclosed herein, the primary and secondary coded identification can use laser markings along with an optical reader and/or can use a Radio Frequency Identification (RFID) system having RFID tags and a reader.

As noted above for sucker rods, the primary coded identification can include the coded marking applied to the sucker rod, such as applied to the particular section of the sucker rod. For example, the coded marking can use the non-damaging laser marking technology (such as but not limited to laser annealing), as discussed above. In the implementations discussed above, the coded marking to properly identify and trace sucker rods can use a two-dimensional matrix code (such as a QR code and its variations). The identified section of the sucker rod is the pin undercut area defined between the shoulder face and the threaded section of the pin end. This section is not usually in contact with the downhole damaging environment (wellbore fluids). Moreover, this section is concealed inside of the sucker rod connection so that the coded making produced by the non-damaging laser marking will be readable after being used.

This innovative approach allows for the precise and permanent marking of steel sucker rods without causing any damage or indentations. The coded information can enable efficient tracking of each rod's unique identification and comprehensive access to its manufacturing, remanufacturing, and in-use historical data.

For sucker rods, the secondary coded identification can use RFID tags installed and secured in removable thread protectors for the threaded wellbore components. Each secondary tag is linked to a primary identification. In the case of thread protector removal, the new replacement will be the new link to the primary identification source.

For example, FIGS. 10A-10B illustrate perspective views of an outside and inside of a thread protector 310 for a sucker rod 30 having a form of secondary coded information 300 according to the present disclosure. Meanwhile, FIGS. 11A-11B illustrate perspective views of a thread protector 310 on a sucker rod 30.

The thread protector 310 includes an outside or closed end 312 and an inside or open end 314. The outside is exposed to the elements during storage and transport. The inside 314 fits onto the pin end 40 of the sucker rod and can hold the secondary coded information 300. In this example, the secondary coded information 300 is an RFID device, such as a passive RFID tag or chip, installed in the inside 314 of the thread protector 310. As shown in FIGS. 11A-11B, the thread protector 310 installed on the pin end 40 covers the upset having primary coded information (i.e., coded indicium 80) and engages on the pin shoulder 38. Meanwhile, the RFID device 300 remains protected inside the thread protector 310 on the pin end 40.

Although shown on the inside 314 of the thread protector 310, the RFID device 300 can be installed elsewhere on the thread protector 310, such as on the inside, outside, top, or bottom surface. Moreover, the RFID device 300 can even be embedded in the thread protector 310, such as by being molded into the plastic material of the thread protector 310.

Figure 12A:
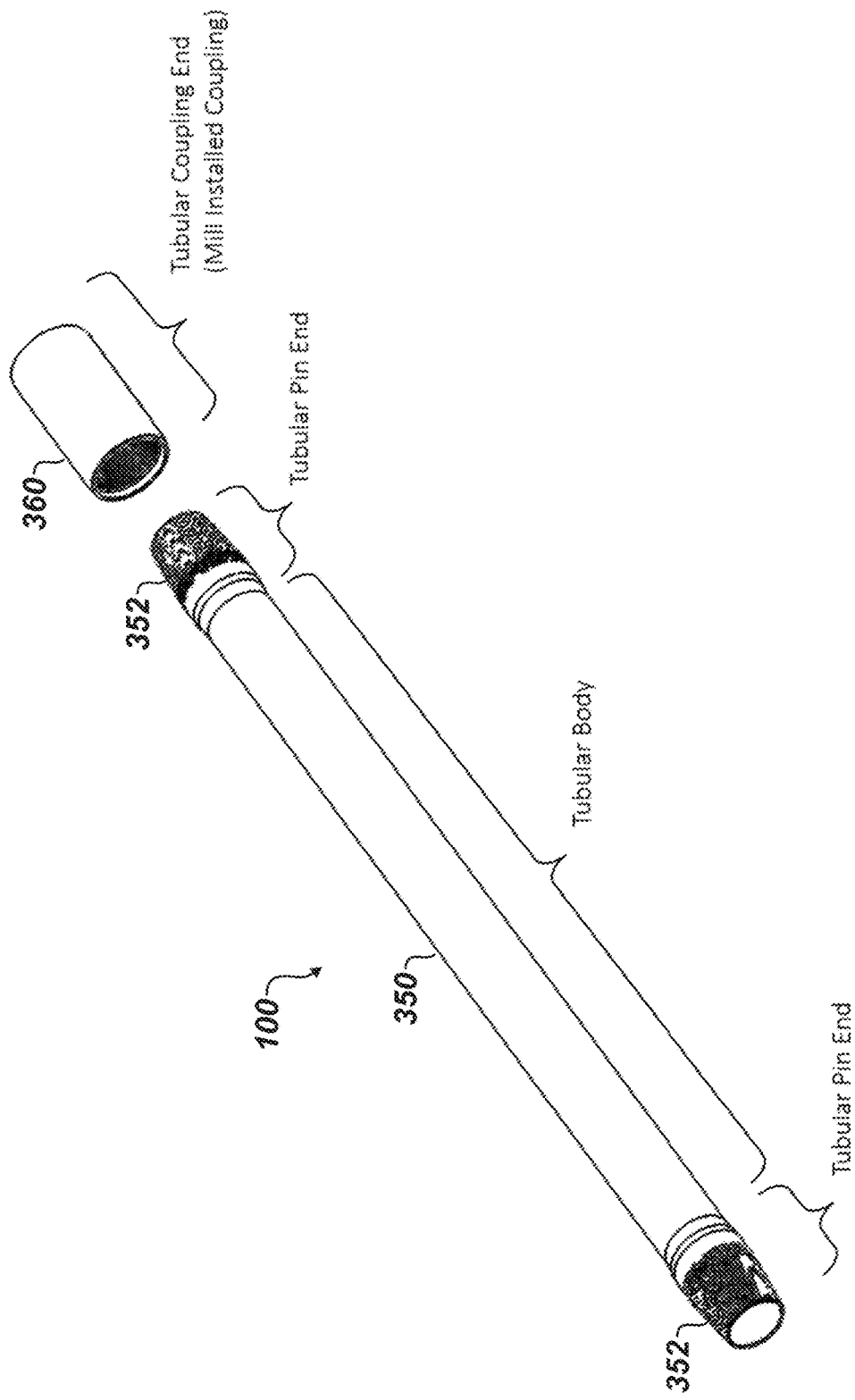
FIGS. 12A-12B illustrate perspective views of a tubular according to the present disclosure in unassembled and assembled states.
Figure 12B:
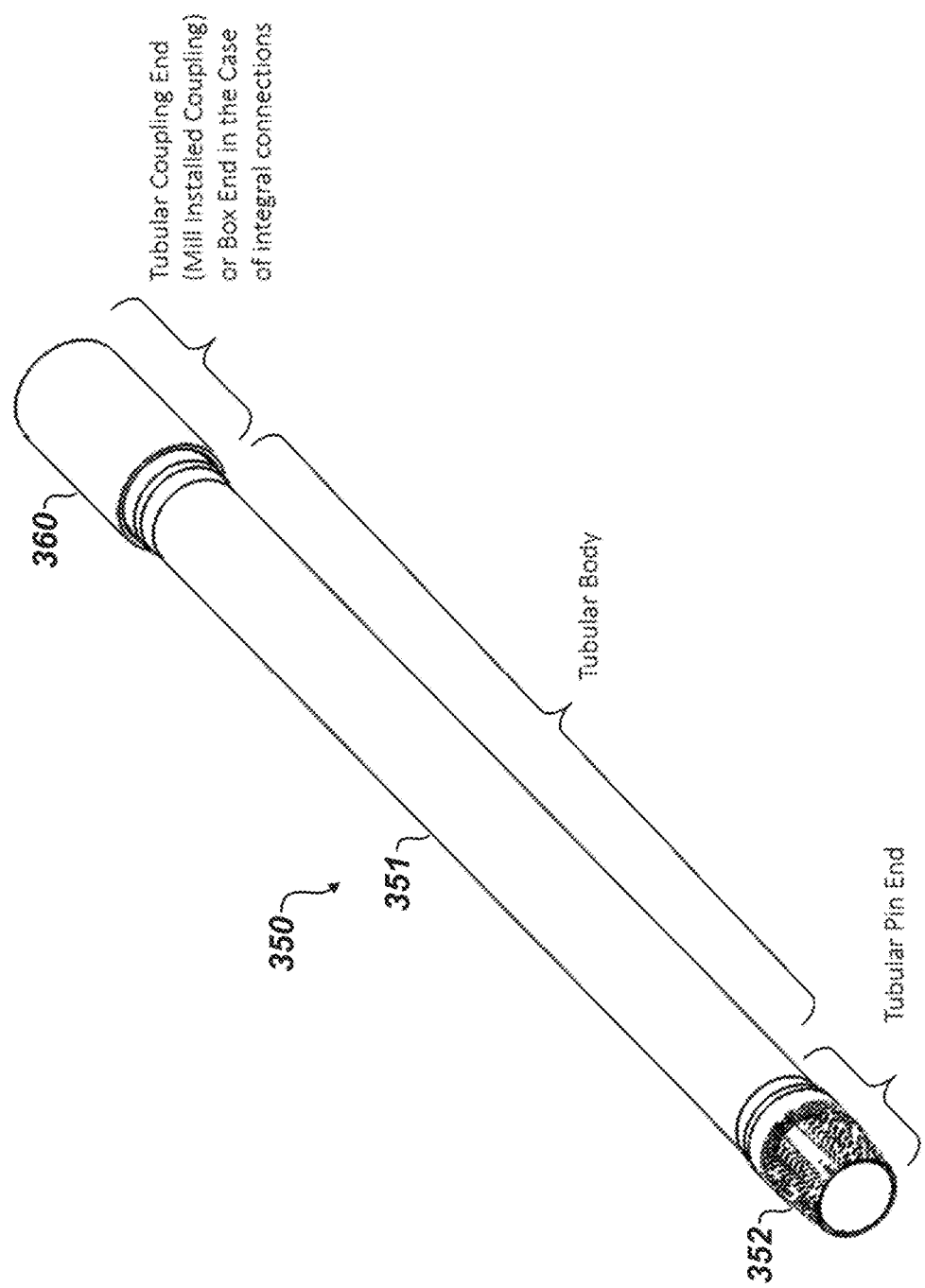
Figure 13:
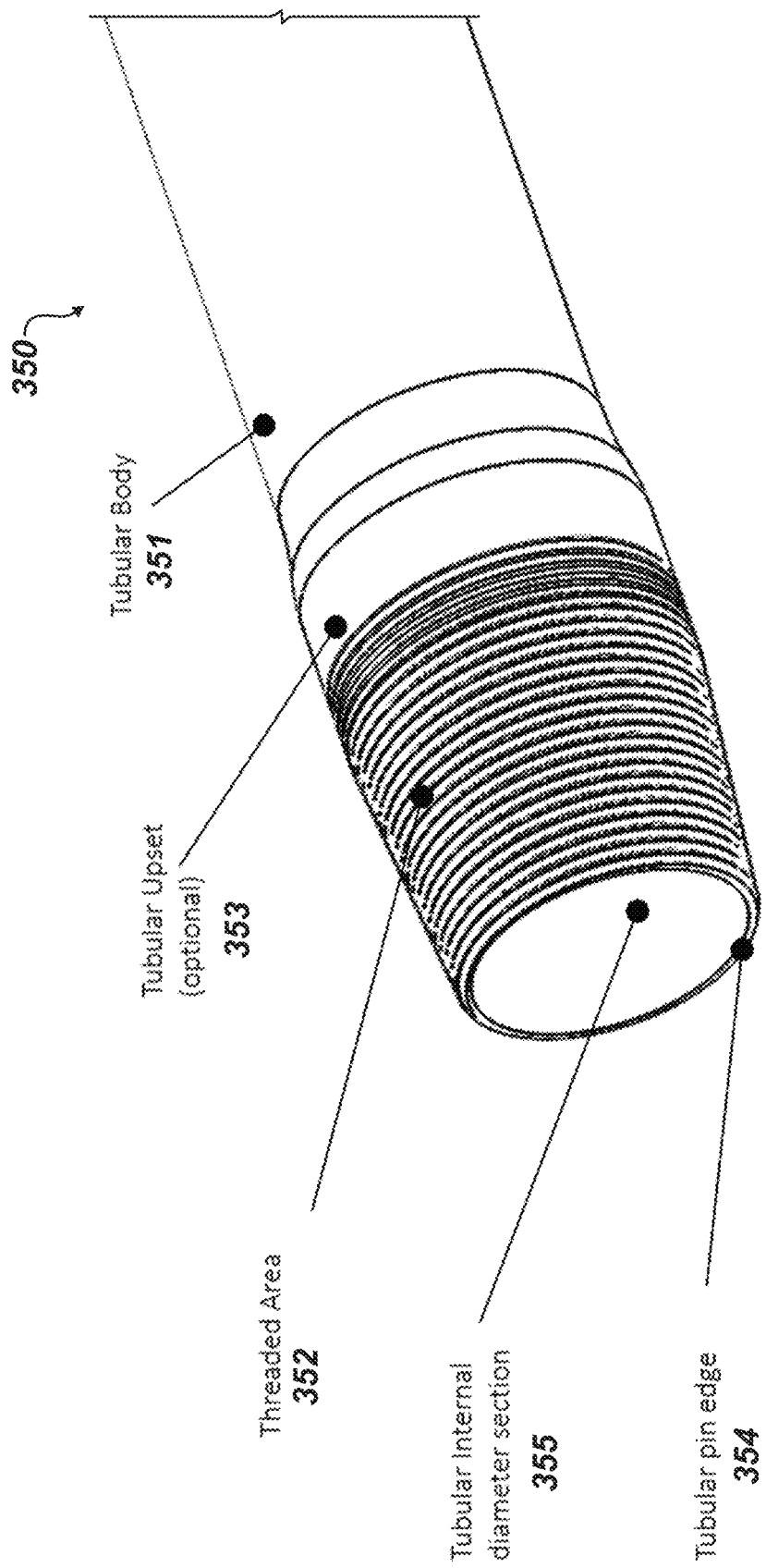
FIG. 13 illustrates a perspective view of a pin end of the tubular.
Figure 14:
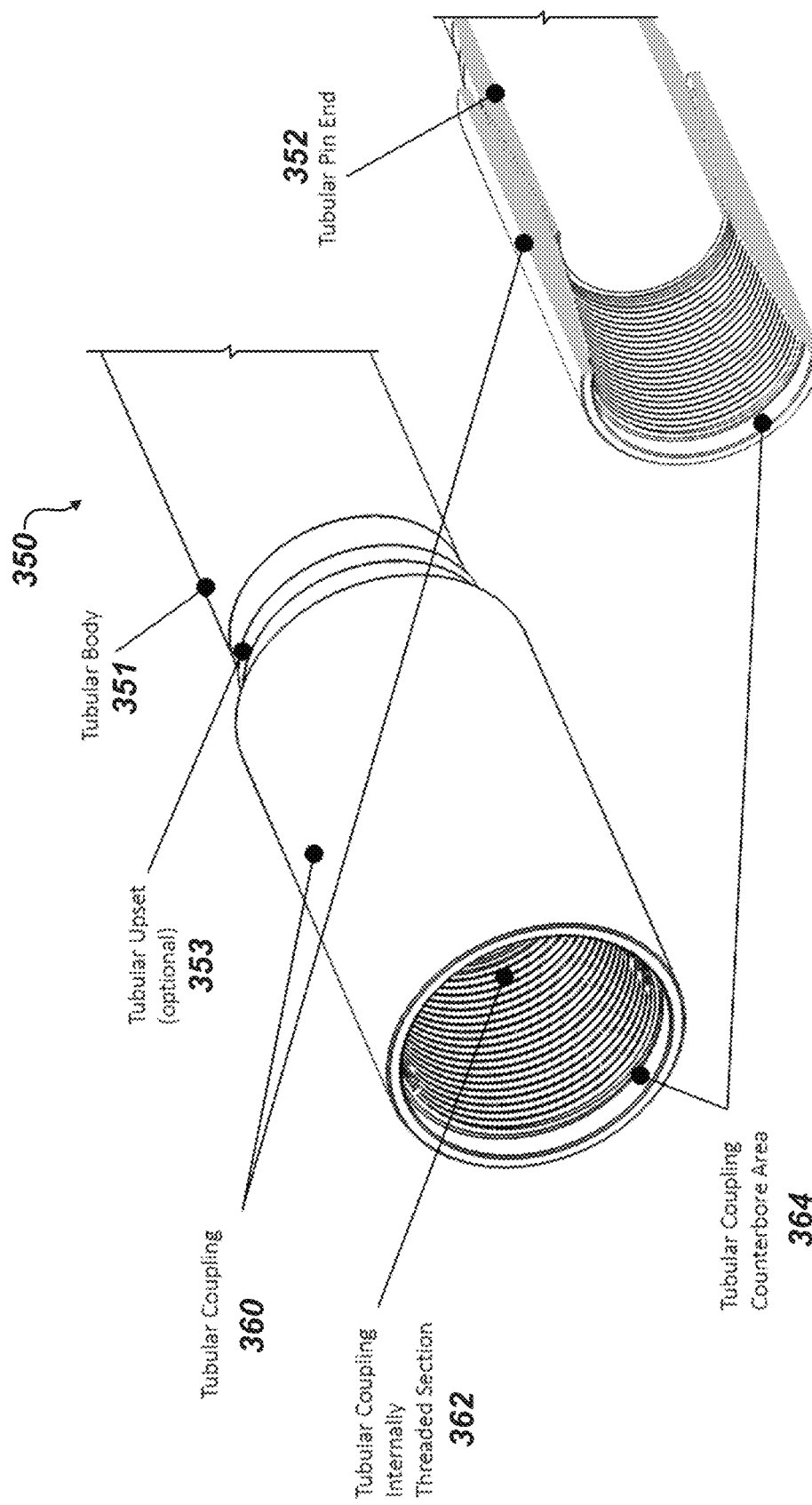
FIGS. 14A-14B illustrate a perspective view and a cross-sectional view of a box end of the tubular.
Figure 15:
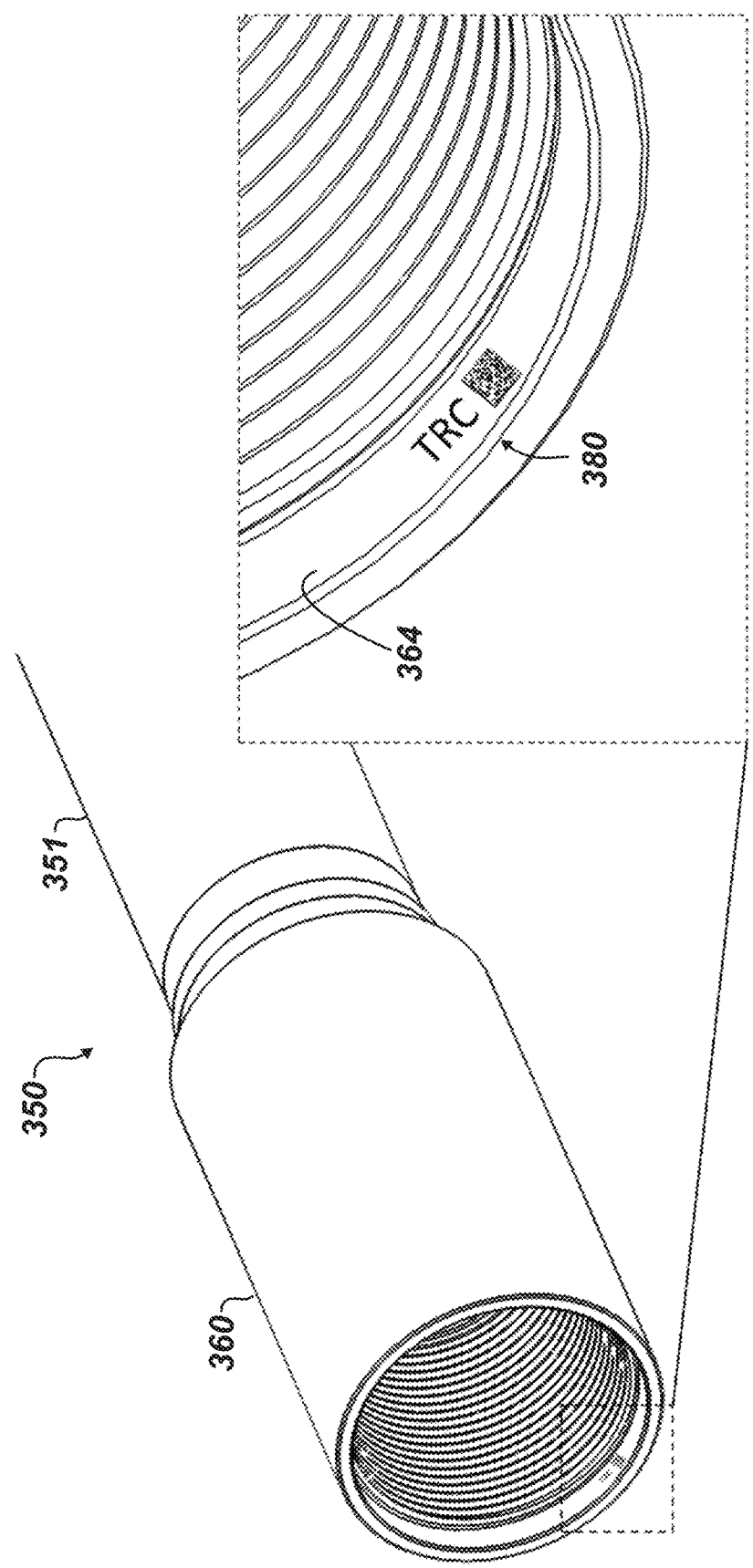
FIG. 15 illustrates a perspective view of primary coded information applied to the box end of the tubular.

Turning now to tubular components, discussion focuses on FIGS. 12A through 17B. For example, FIGS. 12A-12B illustrate perspective views of a tubular 350 according to the present disclosure in unassembled and assembled states, and FIG. 13 illustrates a perspective view of a pin end 352 of the tubular 350. Moreover, FIGS. 14A-14B illustrate a perspective view and a cross-sectional view of a box end of a mill end coupling 360 of the tubular 350, and FIG. 15 illustrate a perspective view of primary coded information 380 applied to the box end of the mill end coupling 360 of the tubular 350.

For the tubular 350, the primary coded information 380 can include a coded indicium 380, laser-annealed marking, etc. applied to the tubular 350. For example, the coded indicium 380 can use non-damaging laser marking technology (such as but not limited to laser annealing), as discussed above. The coded indicium 80 can be used to properly identify and trace the tubulars and can use a two-dimensional matrix code (such as a QR code and its variations).

In contrast to sucker rods, the tubular 350 may not have a heavily protected area for placement of the coded indicium 380. For example, the tubular 350 as shown in FIG. 13 has a tubular body 351 having threaded pin ends 352. An upset 353 may be formed between the tubular body 351 and the threaded pin ends 352. In either case, the threaded pin end 352 terminates at a pin edge 354 that surrounds the opening to the tubular's inner bore 355, which defines its internal diameter section. During handling and use, the outside surfaces of the tubular body 351 and upset 353 are exposed to the environment and surface friction. The threaded area of the pin end 352 is mated during use to a coupling member. The pin edge 354 may be used for a compressive friction loading, and the inner bore 355 is exposed to fluids and friction. Most of these areas may not be well suited to have the coded indicium 380.

Preferably, the coded indicium 380 is applied to the tubular 350 at a section that is not under load and is only partially exposed to well fluids. In particular and as shown in FIGS. 14A-14B and FIG. 15, one identified section includes the counterbore 364 on an open end of a mill end coupling 360 connected on a pin end 352 of the tubular body 351. The mill end coupling 360 will not be removed during operation and will remain connected to the tubular body 351 unless one of the parts is permanently damaged and needs replacement or machining. (Should machining be needed due to damage, a new primary identification can be reapplied. This new primary identification may or may not be linked to the previous one depending on end-user requirements.) In any event, the coded indicium 380 is implemented by using non-damaging laser marking technology (such as, but not limited to, laser annealing), which can properly identify and trace the tubular 350 with the use of QR code (two-dimensional matrix code, in its all variations).

Similar to the sucker rods, the tubular 350 can also use a thread protector for handling and storage, and the thread protector can include secondary coded identification according to the present disclosure.

Figure 16B:
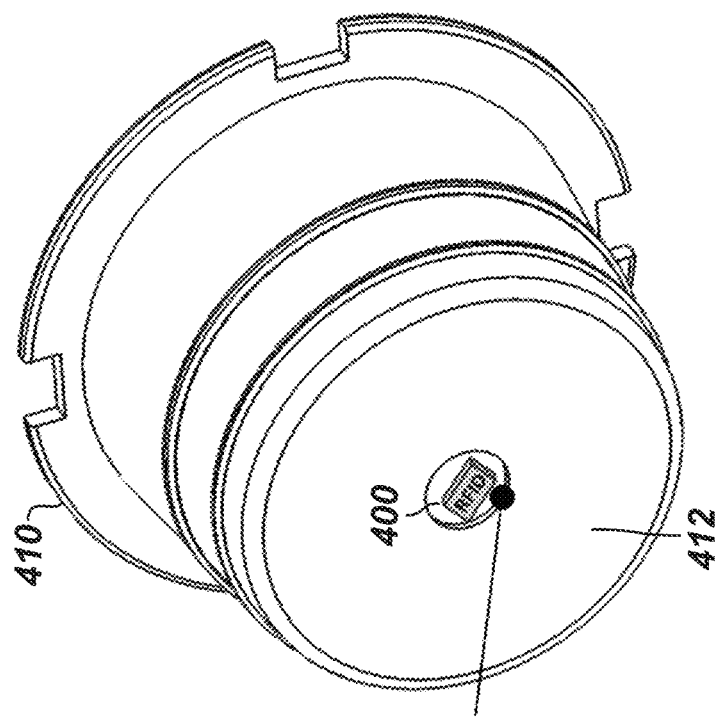
FIGS. 16A-16B illustrate perspective views of an outside and inside of a thread protector for a tubular having a form of secondary coded information according to the present disclosure.
Figure 16A:
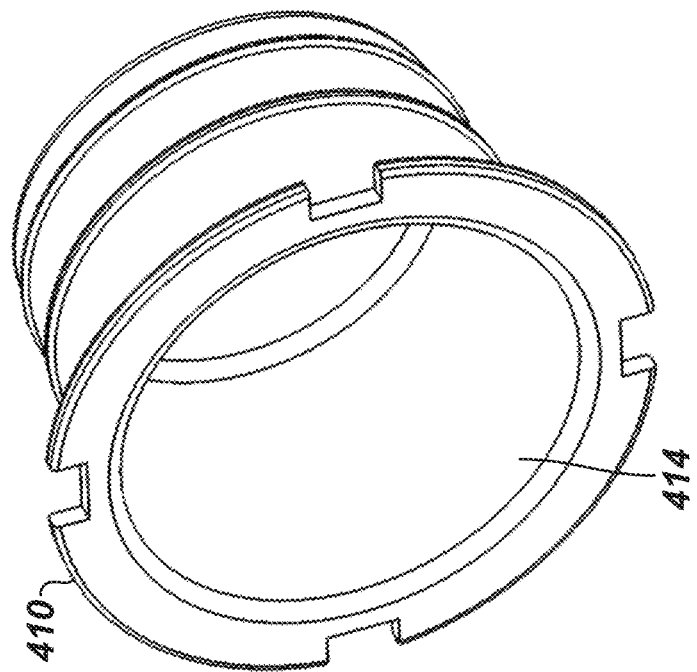

For example, FIGS. 16A-16B illustrate perspective views of a thread protector 410 for the box end of the tubular 350. FIG. 16A shows an outside or open end of the thread protector 410, and FIG. 16B shows an inside or closed end of the thread protector 410 for a tubular. The inside 412 of the protector 410 has a form of secondary coded information 400 according to the present disclosure. As shown, the secondary coded identification 400 can use an RFID device installed and secured to the removable thread protector 410.

Figure 17B:
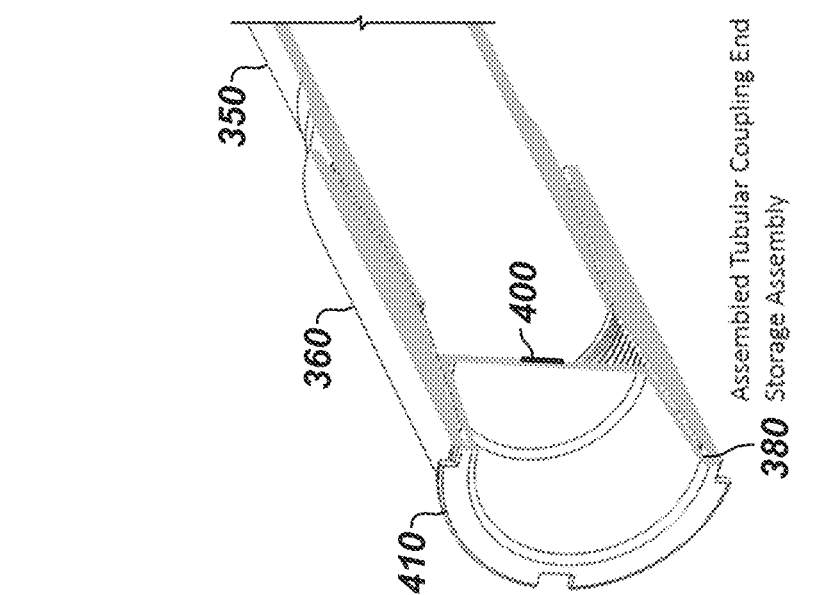
FIGS. 17A-17B illustrate perspective views of a thread protector on a box end of a tubular.
Figure 17A:
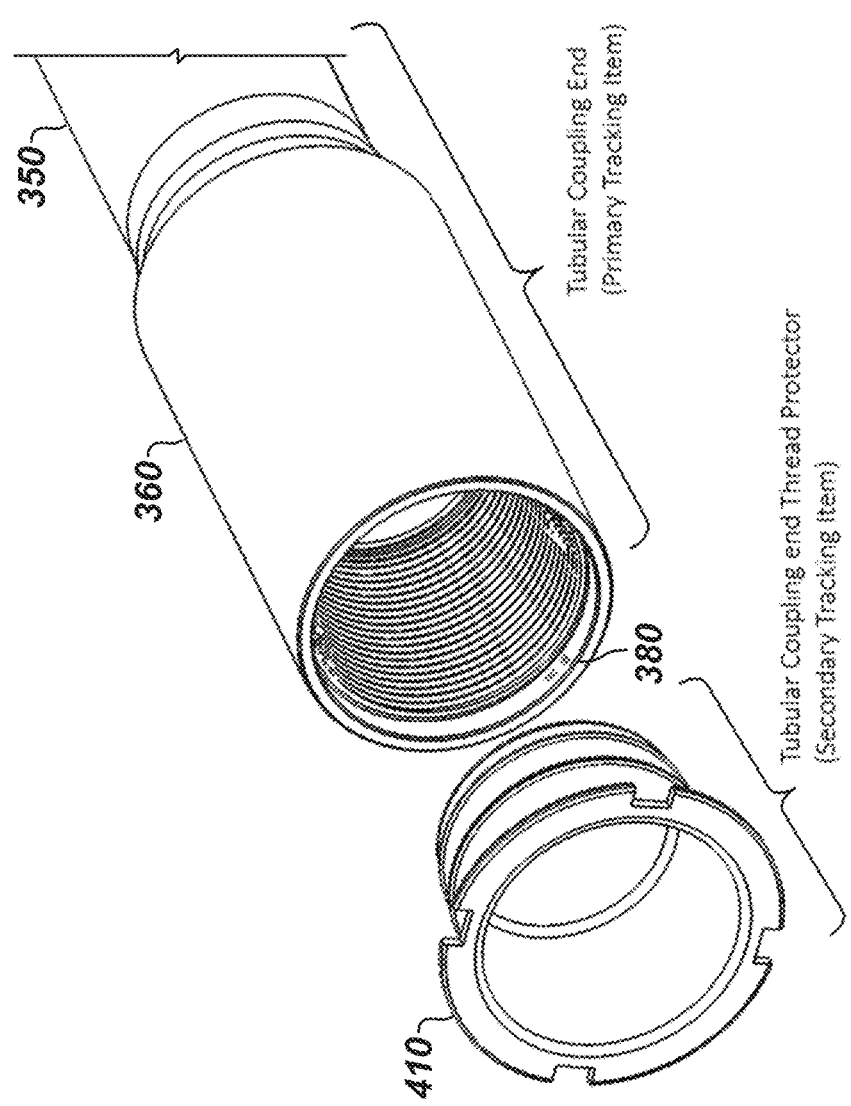

As shown in FIGS. 17A-17B, the thread protector 410 fits in the box end of the mill end coupling 360 of the tubular 350. The thread protector 410 covers the primary coded indicium 380 on the counterbore 364 of the mill end coupling 360. The secondary RFID device 400 on the closed end of the thread protector 410 remains protected inside the tubular 350 for storage and handling.

Although shown on the closed end of the thread protector 410, the RFID device 400 can be installed elsewhere on the thread protector 410, such as on the inside, outside, top, or bottom surface. Moreover, the RFID device 400 can even be embedded in the thread protector 410, such as by being molded into the plastic material of the thread protector 410.

For both the threaded wellbore components 30, 350, each secondary RFID device 300, 400 is linked to the primary coded indicium 80, 380. The installed thread protector 310, 410 is removed when the threaded wellbore components 30, 350 is used. When the threaded wellbore components 30, 350 is retrieved for storage, reuse, and the like, a replacement thread protector 310, 410 having a new secondary RFID device 300, 400 can be relinked to the primary coded indicium 80, 380 on the threaded wellbore components 30, 350.

Coded identification (e.g., the primary coded indicium 80, 380 and the secondary RFID devices 300, 400) is then linked in a master inventory management system, which will allow processing of inventory movements and evaluation of key performance indicators for the threaded wellbore components 30, 350. The coded identification (e.g., 80, 380, 300, 400) does not damage the threaded wellbore components 30, 350 in use, and the coded identification (e.g., 80, 380, 300, 400) is low-cost and is easy to implement in industrial and field applications.

In the case of the primary coded identification (e.g., 80, 380), the user of the sucker rod 30 or tubular 350 can use a QR reader, a cellphone application, or other optical device to access the threaded wellbore component's historical data and can also add information on the component's profile. For example, the profile information can be updated to show the use of the threaded wellbore components 30, 350 in a different well or to show that the threaded wellbore components 30, 350 has been sent for inspection or has a failure.

The performance of the threaded wellbore components 30, 350 can be traced back to information of the well, such as the depth of operation of each particular piece of threaded wellbore components 30, 350. Specific conditions in the wellbore that produce wear or damage to the threaded wellbore components 30, 350 can be identified, which can indicate the need for modifications or changes to a given implementation. All the while, the secondary coded identification in the form of the RFID devices or the like can be used for easy inventory management when storing, transporting, and handling the threaded wellbore components 30, 350. The secondary coded identification (e.g., 300, 400) can be read electronically while the thread protectors 310, 410 remain on the threaded wellbore components 30, 350 and cover the primary coded information (e.g., 80, 380).

Figure 18:
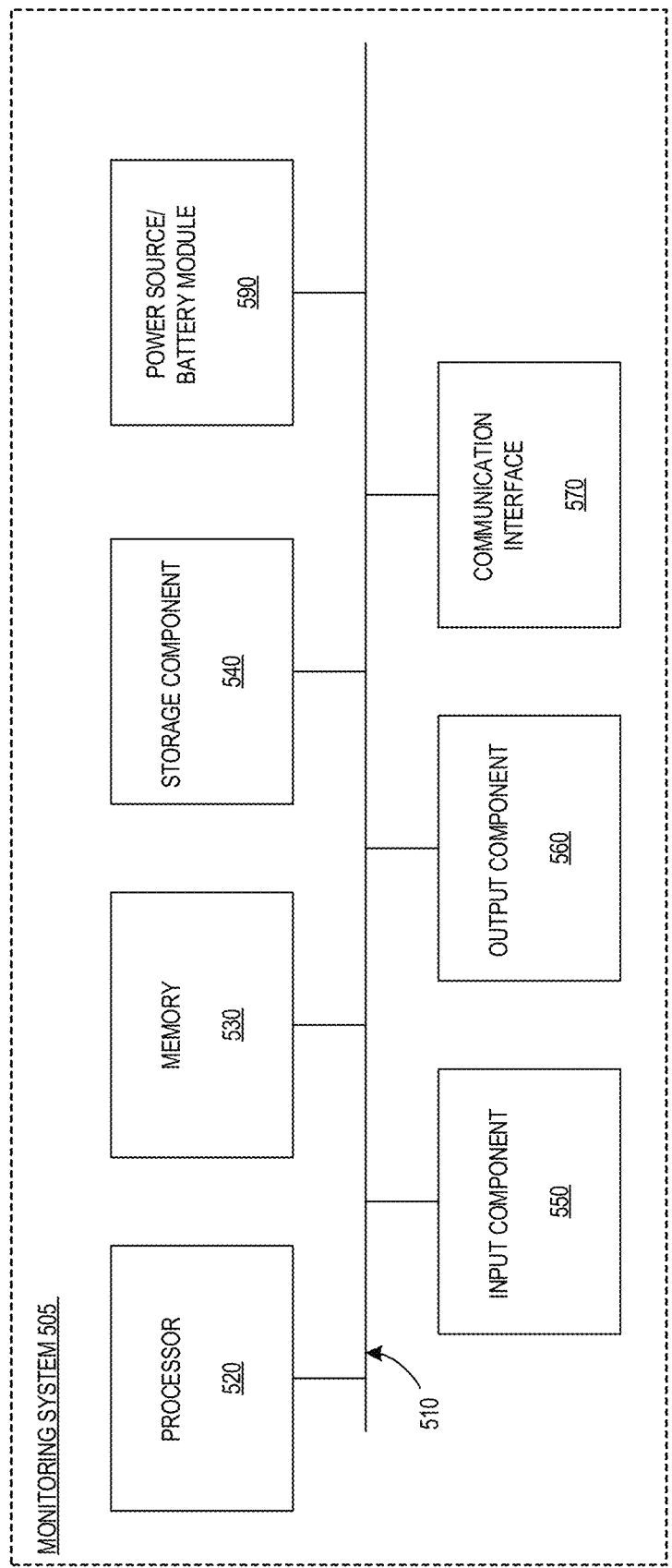
FIG. 18 is a diagram of components of a monitoring system according to an example of the present disclosure.

FIG. 18 is a diagram of components of a monitoring system 505 according to an example of the present disclosure. The monitoring system 505 may include components such as disclosed above with the monitoring system 250 in FIG. 9. The monitoring system 505 may include a bus 510, a processor 520, a memory 530, a storage component 540, an input component 550, an output component 560, a communication interface 570, and a battery module or power source 590.

The bus 510 includes a component that permits communication among the components of The monitoring system 505. The processor 520 is implemented in hardware, firmware, or a combination of hardware and software. The processor 520 can include a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some examples, the processor 520 includes one or more processors capable of being programmed to perform a function. For example, the processor can include a centralized computer system and various handheld or mobile devices, which can be used in the field, on rigs, in storage yards, etc. and can communicate with the centralized computer system.

The memory 530 may include one or more memories such as a random-access memory (RAM), a read only memory (ROM), and/or another type of dynamic or static storage device (e.g., a flash memory, a magnetic memory, and/or an optical memory) that stores information and/or instructions for use by the processor 520.

The storage component 540 stores information and/or software related to the operation and use of the monitoring system 505. For example, the storage component 540 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 550 includes a component that permits the monitoring system 505 to receive information, such as via user input (e.g., a touch screen display, a keyboard, a keypad, a mouse, a button, a switch, and/or a microphone). Additionally, or alternatively, the input component 550 may include a sensor for sensing information (e.g., an optical reader, a camera, a scanner, an RFID reader, and RFID reader/writer, etc.). The output component 560 includes a component that provides output information from the monitoring system 505 (e.g., a display, a speaker, a user interface, etc.).

The communication interface 570 includes a transceiver-like component (e.g., a transceiver and/or a separate receiver and transmitter) that enables monitoring system 505 to communicate with other devices, such as via a wired connection, a wireless connection, or a combination of wired and wireless connections. The communication interface 570 may permit the monitoring system 505 to receive information from another device and/or provide information to another device. For example, the communication interface 570 may include an Ethernet interface, an optical interface, a coaxial interface, an infrared interface, an RF interface, a universal serial bus (USB) interface, a Wi-Fi interface, a cellular network interface, or the like.

The power source or battery module 590 is connected along bus 510 to supply power to the processor 520, the memory 530, and the internal components of monitoring system 505. The battery module 590 may supply power during field measurements by monitoring system 505. The battery module 590 permits the monitoring system 505 to be a portable integrated device for conducting field measurements of propagation delay in a RAN.

The monitoring system 505 may perform one or more processes described herein. The monitoring system 505 may perform these processes by the processor 520 executing software instructions stored by a non-transitory computer-readable medium, such as memory 530 and/or storage component 540. A computer-readable medium is defined herein as a non-transitory memory device. A memory device includes memory space within a single physical storage device or memory space spread across multiple physical storage devices.

Software instructions may be read into the memory 530 and/or storage component 540 from another computer-readable medium or from another device via the communication interface 570. When executed, software instructions stored in memory 530 and/or storage component 540 may instruct the processor 520 to perform one or more processes described herein. Additionally or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 18 are provided as an example. In practice, the monitoring system 505 may include additional components, fewer components, different components, or differently arranged components than those shown in FIG. 18. Additionally or alternatively, a set of components (e.g., one or more components) of monitoring system 505 may perform one or more functions described as being performed by another set of components of the monitoring system 505.

The foregoing description of preferred and other embodiments is not intended to limit or restrict the scope or applicability of the inventive concepts conceived of by the Applicants. It will be appreciated with the benefit of the present disclosure that features described above in accordance with any aspect of the disclosed subject matter can be utilized, either alone or in combination, with any other described feature, in any other aspect of the disclosed subject matter.

The invention claimed is:

1. A method, comprising:
providing an endpiece for a sucker rod of a rod string, the endpiece at least including wrench flats, a shoulder adjacent to the wrench flats, and a pin end extending from the shoulder and having a threaded area; and
applying an indicium to a surface disposed on the pin end of the endpiece, the indicium being configured to be covered by a coupling of a sucker rod connection of the rod string utilized on the pin end, the indicium being optically-coded and being machine-readable.

2. The method of claim 1, wherein providing the endpiece comprises one of:
providing the sucker rod having the endpiece disposed on a rod body of the sucker rod;
providing the endpiece with a receptacle defined therein, and the method comprises affixing the receptacle of the endpiece on a rod end of the rod body for the sucker rod;
forming the endpiece with the receptacle defined therein, and affixing the receptacle of the endpiece on the rod end of the rod body for the sucker rod;
forming the endpiece on the rod body of the sucker rod; and
forging the endpiece on an upset at the rod end of the rod body, and after forging, the method comprises heat treating the sucker rod at least before applying the indicium.

3. The method of claim 2, wherein affixing the receptacle of the endpiece on the rod end of the rod body for the sucker rod by:
applying an adhesive to at least one of the rod end and the receptacle;
installing the rod end into the receptacle;
setting the adhesive therebetween; and
applying a tensile load between the rod end and the endpiece up to a tensile threshold.

4. The method of claim 1, wherein providing the endpiece comprises threading the threaded area on the pin end at least one of (i) before applying the indicium, and (ii) after applying the indicium.

5. The method of claim 1, wherein providing the endpiece for the sucker rod comprises refurbishing a used endpiece for the sucker rod.

6. The method of claim 5, wherein applying the indicium comprises at least one of:
applying a new indicium on the used endpiece that lacks an existing indicium;
applying a new indicium on the used endpiece that has an existing indicium, and leaving the existing indicium;
applying a new indicium on the used endpiece that has an existing indicium, and removing the existing indicium; and
applying a new indicium on the used endpiece that has an existing indicium, and marking over the existing indicium.

7. The method of claim 1, wherein applying the indicium to the surface comprises one of:
laser annealing the indicium to the surface;
laser ablating the indicium to the surface;
removing portion of a mask on the surface using a laser beam and applying a chemical etchant to the surface exposed by an unmasked portion;
laser forming the indicium on the surface;
marking the surface with the indicium using an ultraviolet laser beam; and
applying a compound to the surface, and ablating a layer of the compound using a $CO_2$ laser beam.

8. The method of claim 1, wherein applying the indicium comprises applying at least one of a unique serial number, an optically-coded machine-readable code, a scannable code, a quick response (QR) code, a bar code, and a two-dimensional matrix code.

9. A method, comprising:
providing an endpiece for a sucker rod of a rod string, the endpiece at least including wrench flats, a shoulder adjacent to the wrench flats, and a pin end extending from the shoulder and having a threaded area;

applying an indicium to a surface disposed on the pin end of the endpiece, the indicium being configured to be covered by a sucker rod connection of the rod string utilized on the pin end, the indicium being optically-coded and being machine-readable; and
associating the indicium with component information related to the sucker rod by at least one of:
encoding the component information directly into the indicium; and
linking the indicium to the component information stored separately.

10. The method of claim 9, wherein applying the indicium to the surface disposed on the pin end of the endpiece, the indicium being configured to be covered by the sucker rod connection utilized on the pin end comprises at least one of:
applying the indicium to the surface disposed on the pin end and configured to be covered by a coupling of the sucker rod connection utilized on the pin end;
applying the indicium to the surface disposed on an undercut area on the pin end located between the threaded area and the shoulder; and
applying the indicium to the surface disposed on a distal face on the pin end.

11. The method of claim 9, further comprising confirming application of the indicium to the surface by reading the indicium using an optical reader.

12. The method of claim 9, further comprising tracking usage of the sucker rod by using the component information associated with the indicium and related to the sucker rod.

13. The method of claim 9, wherein the component information related to the sucker rod comprises at least one of a serial number, an identifier, a lot number, a place of manufacture, a manufacturer, a manufacture date, a material, a usage history, a total run-time, a refurbishment status, and an age of the sucker rod.

14. A sucker rod manufactured by the method according to claim 1.

15. A sucker rod having at least one endpiece manufactured by a method, comprising:
providing the at least one endpiece for the sucker rod of a rod string, the at least one endpiece at least including wrench flats, a shoulder adjacent to the wrench flats, and a pin end extending from the shoulder and having a threaded area; and
applying an indicium to a surface disposed on the pin end of the at least one endpiece, the indicium being configured to be covered by a sucker rod connection of the rod string utilized on the pin end, the indicium being optically-coded and being machine-readable.

16. The method of claim 9, wherein associating the indicium with the component information related to the sucker rod further comprises:
associating primary coded information with the endpiece having the indicium;
associating secondary coded information with the endpiece by applying a machine-readable device on a thread protector for use on the threaded area of the endpiece; and
tracking the endpiece by linking the primary coded information to the secondary coded information.

17. The method of claim 16, wherein applying the machine-readable device on the thread protector for use on the threaded area of the endpiece comprises one of:
affixing a radio frequency identification (RFID) device on a surface of the thread protector; and
embedding the radio frequency identification (RFID) device in the thread protector.

18. The method of claim 16, wherein tracking the endpiece comprises:
optically reading the indicium adjacent the threaded area of the endpiece with the thread protector removed; and
electronically reading the machine-readable device on the thread protector present on the threaded area of the endpiece.

19. A method, comprising:
providing an endpiece for a sucker rod, the endpiece at least including wrench flats, a shoulder adjacent to the wrench flats, and a pin end extending from the shoulder and having a threaded area; and
applying an indicium with a laser to a surface disposed on the pin end and configured to be covered by a coupling utilized on the pin end, the indicium being optically-coded and being machine-readable,
wherein applying the indicium with the laser to the surface comprises at least one of:
applying the indicium to the surface disposed on an undercut area on the pin end located between the threaded area and the shoulder; and
applying the indicium to the surface disposed on a distal face on the pin end.

20. The method of claim 19, wherein applying the indicium with the laser to the surface comprises one of:
laser annealing the indicium to the surface;
laser ablating the indicium to the surface;
removing portion of a mask on the surface using a laser beam and applying a chemical etchant to the surface exposed by an unmasked portion;
laser forming the indicium on the surface;
marking the surface with the indicium using an ultraviolet laser beam; and
applying a compound to the surface, and ablating a layer of the compound using a $CO_2$ laser beam.

21. The method of claim 19, wherein applying the indicium comprises associating the indicium with component information related to the sucker rod by at least one of:
encoding the component information directly into the indicium; and
linking the indicium to the component information stored separately.

22. A sucker rod manufactured by the method according to claim 19.

23. The sucker rod of claim 15, wherein applying the indicium to the surface comprises one of:
laser annealing the indicium to the surface;
laser ablating the indicium to the surface;
removing portion of a mask on the surface using a laser beam and applying a chemical etchant to the surface exposed by an unmasked portion;
laser forming the indicium on the surface;
marking the surface with the indicium using an ultraviolet laser beam; and
applying a compound to the surface, and ablating a layer of the compound using a $CO_2$ laser beam.

24. The sucker rod of claim 15, wherein applying the indicium to the surface comprises at least one of:
applying the indicium to the surface disposed on an undercut area on the pin end located between the threaded area and the shoulder; and
applying the indicium to the surface disposed on a distal face on the pin end.

25. The method of claim 1, wherein applying the indicium comprises associating the indicium with component information related to the sucker rod by at least one of:

encoding the component information directly into the indicium; and linking the indicium to the component information stored separately.

26. A method, comprising:

providing an endpiece for a sucker rod of a rod string, the endpiece at least including wrench flats, a shoulder adjacent to the wrench flats, and a pin end extending from the shoulder and having a threaded area; and applying an indicium to a surface disposed on an undercut area on the pin end located between the threaded area and the shoulder, the indicium being optically-coded and being machine-readable.

27. The method of claim 26, wherein applying the indicium to the surface comprises one of:

laser annealing the indicium to the surface;

laser ablating the indicium to the surface;

removing portion of a mask on the surface using a laser beam and applying a chemical etchant to the surface exposed by an unmasked portion;

laser forming the indicium on the surface;

marking the surface with the indicium using an ultraviolet laser beam; and applying a compound to the surface, and ablating a layer of the compound using a $CO_2$ laser beam.

28. The method of claim 26, wherein applying the indicium comprises associating the indicium with component information related to the sucker rod by at least one of:

encoding the component information directly into the indicium; and linking the indicium to the component information stored separately.

29. A sucker rod manufactured by the method according to claim 26.

30. A method, comprising:

providing an endpiece for a sucker rod of a rod string, the endpiece at least including wrench flats, a shoulder adjacent to the wrench flats, and a pin end extending from the shoulder and having a threaded area; and applying an indicium to a surface disposed on a distal face on the pin end, the indicium being optically-coded and being machine-readable.

31. The method of claim 30, wherein applying the indicium to the surface comprises one of:

laser annealing the indicium to the surface;

laser ablating the indicium to the surface;

removing portion of a mask on the surface using a laser beam and applying a chemical etchant to the surface exposed by an unmasked portion;

laser forming the indicium on the surface;

marking the surface with the indicium using an ultraviolet laser beam; and applying a compound to the surface, and ablating a layer of the compound using a $CO_2$ laser beam.

32. The method of claim 30, wherein applying the indicium comprises associating the indicium with component information related to the sucker rod by at least one of:

encoding the component information directly into the indicium; and linking the indicium to the component information stored separately.

33. A sucker rod manufactured by the method according to claim 30.

* * * * *